United States Patent
Ishizawa

(10) Patent No.: US 8,514,245 B2
(45) Date of Patent: Aug. 20, 2013

(54) IMAGE SELECTION DEVICE AND CONTROL METHOD THEREOF

(75) Inventor: Masayuki Ishizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 12/632,596

(22) Filed: Dec. 7, 2009

(65) Prior Publication Data

US 2010/0142833 A1   Jun. 10, 2010

(30) Foreign Application Priority Data

Dec. 9, 2008   (JP) .................. 2008-313398

(51) Int. Cl.
  *G09G 5/00*   (2006.01)
(52) U.S. Cl.
  USPC ....................................... 345/619
(58) Field of Classification Search
  None
  See application file for complete search history.

(56) References Cited

U.S. PATENT DOCUMENTS

| 2006/0203261 A1* | 9/2006 | Kacker .................. 358/1.6 |
| 2007/0076960 A1* | 4/2007 | Takamori et al. ........ 382/224 |
| 2007/0216709 A1* | 9/2007 | Kojima et al. .......... 345/619 |
| 2008/0062283 A1 | 3/2008 | Matsushita et al. |

FOREIGN PATENT DOCUMENTS

| JP | 2000-276484 A | 10/2000 |
| JP | 2006-295889 A | 10/2006 |
| JP | 2007-060562 A | 3/2007 |
| JP | 2007-066241 A | 3/2007 |

* cited by examiner

*Primary Examiner* — Aaron M Richer
*Assistant Examiner* — Mohammad H Akhavannik
(74) *Attorney, Agent, or Firm* — Canon USA Inc. IP Division

(57) ABSTRACT

An image is selected from a plurality of non-selected images, an evaluation value is stored for each value of attribute information of a selected image (cluster) which is selected by the selection unit, and when an image is selected by the selection unit, a presentation priority of the non-selected images is determined based on a value of the attribute information of the non-selected images not selected by the selection unit so that the evaluation values are even.

10 Claims, 21 Drawing Sheets

FIG. 12
1101 — OBJECT INFORMATION FOR ALL IMAGES
| IMAGE ID | OBJECT |
|---|---|
| IMAGE 1 | A |
| IMAGE 2 | A |
| IMAGE 3 | B |
| IMAGE 4 | B |
| IMAGE 5 | C |
1102
| OBJECT | EVALUATION VALUE |
|---|---|
| A | 1 |
| B | 1 |
| C | 0 |
1103
| IMAGE ID | PRESENTATION PRIORITY |
|---|---|
| IMAGE 2 | 2 |
| IMAGE 4 | 3 |
| IMAGE 5 | 1 |
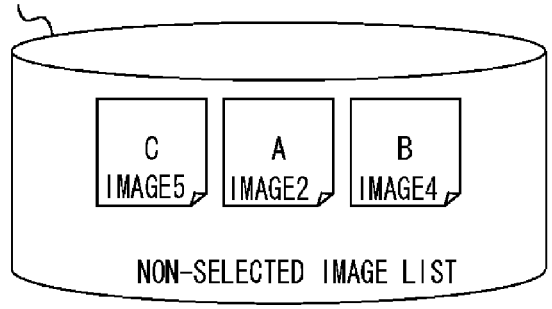
NON-SELECTED IMAGE LIST
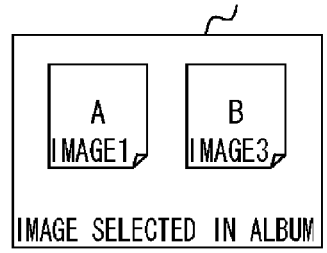
IMAGE SELECTED IN ALBUM

1401

| IMAGE ID | CLASS | OBJECT |
|---|---|---|
| IMAGE 1 | 1 | A |
| IMAGE 2 | 1 | A |
| IMAGE 3 | 2 | B |
| IMAGE 4 | 2 | C |
| IMAGE 5 | 1 | D |

1402

| OBJECT | EVALUATION VALUE WITHOUT CONSIDERATION OF CLASS | EVALUATION VALUE WITH CONSIDERATION OF CLASS |
|---|---|---|
| A | 0 | 0 |
| B | 0 | 5 |
| C | 0 | 5 |
| D | 0 | 0 |

1403

1404

| IMAGE ID | PRESENTATION PRIORITY WITHOUT CONSIDERATION OF CLASS | PRESENTATION PRIORITY WITH CONSIDERATION OF CLASS |
|---|---|---|
| IMAGE 1 | 1 | 1 |
| IMAGE 2 | 2 | 2 |
| IMAGE 3 | 3 | 4 |
| IMAGE 4 | 4 | 5 |
| IMAGE 5 | 5 | 3 |

1405

NON-SELECTED IMAGE LIST

1801

| IMAGE ID | OBJECT | GROUP ID |
|---|---|---|
| IMAGE 1 | A | 1 |
| IMAGE 2 | A | 1 |
| IMAGE 3 | B | 1 |
| IMAGE 4 | B | 2 |
| IMAGE 5 | C | 2 |
| IMAGE 6 | C | 2 |

1802

| OBJECT | EVALUATION VALUE | GROUP ID |
|---|---|---|
| A | 0 | 1 |
| B | 0 | 1 AND 2 |
| C | 0 | 2 |

1803

| GROUP ID | EVALUATION VALUE |
|---|---|
| GROUP 1 | 0 |
| GROUP 2 | 0 |

1804

| GROUP ID | GROUP PRESENTATION PRIORITY |
|---|---|
| GROUP 1 | 1 |
| GROUP 2 | 2 |

1805 NON-SELECTED IMAGE LIST

IMAGE SELECTION DEVICE AND CONTROL METHOD THEREOF

BACKGROUND OF THE INVENTION

1. Field of the Invention

The present invention relates to an image selection device for selecting a plurality of images, and a control method thereof.

2. Description of the Related Art

With the increase in capacity of digital camera hard disks and memory cards over recent years, it has become easier to store a large number of images. When selecting images for an album from among a large number of images, a great deal of effort is required to select the images so that nobody is shown with a biased impression.

Japanese Patent Application Laid-Open No. 2000-276484 discusses a method for performing an efficient image search when selecting an intended image from among a large number of image candidates, by recording once-displayed images in a history, and imposing a restriction on the display of the once-displayed images.

Japanese Patent Application Laid-Open No. 2006-295889 discusses a method in which personal information about an object contained in an image is registered, and such personal information is associated with a second person who has a strong association with a first person. Consequently, an album is produced which is free from bias in the number of times or the area that the first person and the second person are contained in the same page.

According to the technique discussed in Japanese Patent Application Laid-Open No. 2000-276484, a restriction is imposed on images once displayed on a selection candidate screen as a search result. Since the same restriction is imposed based on whether an image has been displayed even when the number of images increases, it is impossible to know which images should be preferentially displayed.

According to the technique discussed in Japanese Patent Application Laid-Open No. 2006-295889, a bias-free impression can be achieved among people who were determined to be associated with each other. However, a specific person is selected even when the images for everybody must be evenly included, in a case such as making a school album.

SUMMARY OF THE INVENTION

The present invention is directed to presenting images during selection of an image so that a user can easily select an image.

According to an aspect of the invention, an image selection device for selecting an image from a plurality of non-selected images having attribute information includes a selection unit configured to select an image from the plurality of non-selected images, a determination unit configured to determine, when the image was selected by the selection unit, a presentation priority of the non-selected images based on the attribute information of the selected image selected by the selection unit and the attribute information of the non-selected images not selected by the selection unit, and a display unit configured to display the non-selected images on a display screen based on the presentation priority determined by the determination unit.

According to another aspect of the invention, a method for controlling an image selection device for selecting an image from a plurality of non-selected images having attribute information includes selecting by a selection unit an image from the plurality of non-selected images, determining by a determination unit, when the image was selected in the selection step, a presentation priority of the non-selected images based on the attribute information of the selected image and the attribute information of the non-selected images which were not selected, and displaying on a display screen by a display unit the non-selected images based on the determined presentation priority.

According to the exemplary embodiments of the present invention, a user can easily select an image when selecting an image from among a large number of images.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates a list of various information according to the third exemplary embodiment of the present invention.

DESCRIPTION OF THE EMBODIMENTS

Various exemplary embodiments, features, and aspects of the invention will be described in detail below with reference to the drawings.

Figure 1:
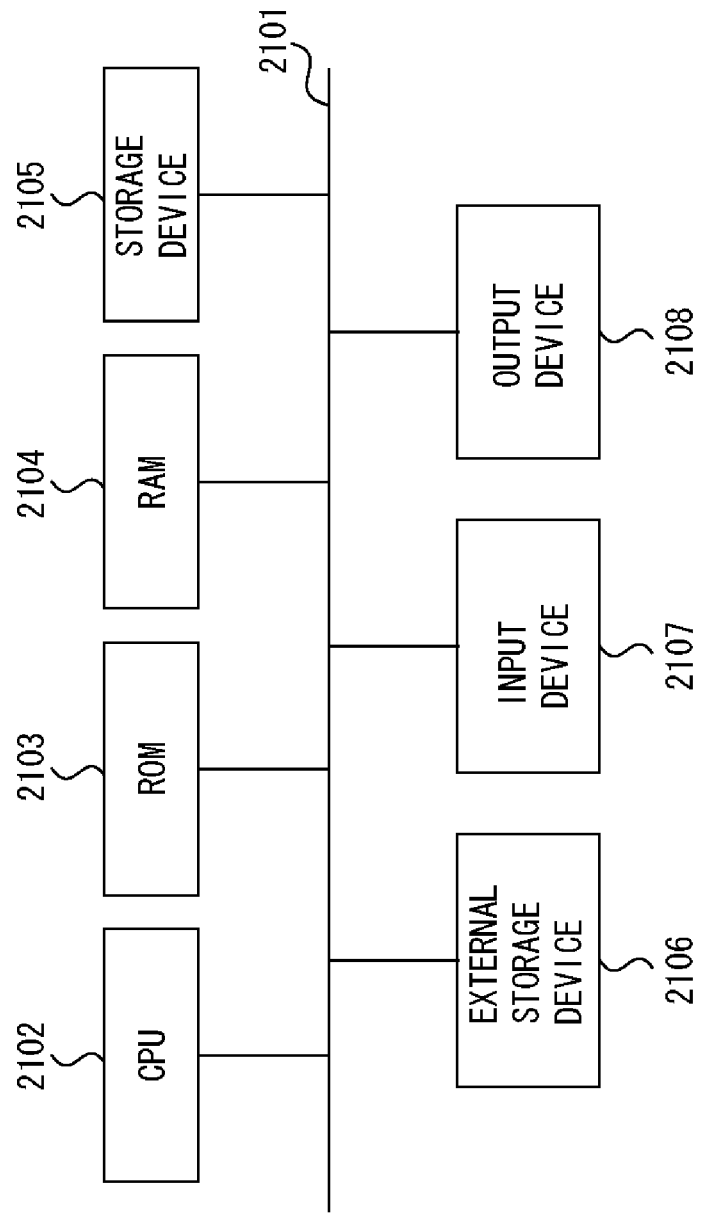
FIG. 1 illustrates a hardware configuration of an image selection device according to a first exemplary embodiment of the present invention.

FIG. 1 is a block diagram illustrating an example of a hardware configuration of an image selection device according to a first exemplary embodiment. This image selection device includes a central processing unit (CPU) 2102. The CPU 2102 performs calculations and logical determinations for various processes, and controls each of the configuration elements connected to a bus 2101.

The present image selection device contains a memory which includes a program memory and a data memory. A program for control by the CPU based on a flowchart is stored in the program memory. This program memory includes the below-described various processes. This memory may be a read only memory (ROM) 2103, or a random access memory (RAM) 2104 into which the program is loaded from an external storage device. This memory may also be realized by a combination of the ROM 2103 and RAM 2104.

A storage device 2105 is a hard disk or the like for storing the data and program according to the present exemplary embodiment. In the present exemplary embodiment, the storage device 2105 is also used for storing images. However, the device for storing images may also be a contents storage device which is externally connected, or connected to a network. Further, an external storage device 2106 may also be used as a device which plays a role similar to the storage device 2105. The external storage device 2106 can be realized by, for example, a medium (recording medium) and an external storage drive for accessing the medium. Examples of this medium may include a flexible disk (FD), a compact disc ROM (CD-ROM), a digital versatile disc (DVD), a universal serial bus (USB) memory, a magneto optical (MO) disk, a flash memory and the like.

An input device 2107 is used to input instructions from the user. The user sends instructions to an image processing apparatus via the input device 2107. The input device 2107 can be realized by, for example, a keyboard or a pointing device.

An output device 2108 acts as a display unit on which processing results from a contents management device 2100 are displayed and output. The output device 2108 can be realized by, for example, a display device such as a cathode-ray tube (CRT) or a liquid crystal display device including an output circuit. In the present exemplary embodiment, images are displayed on the output device (display device) 2108.

Figure 2:
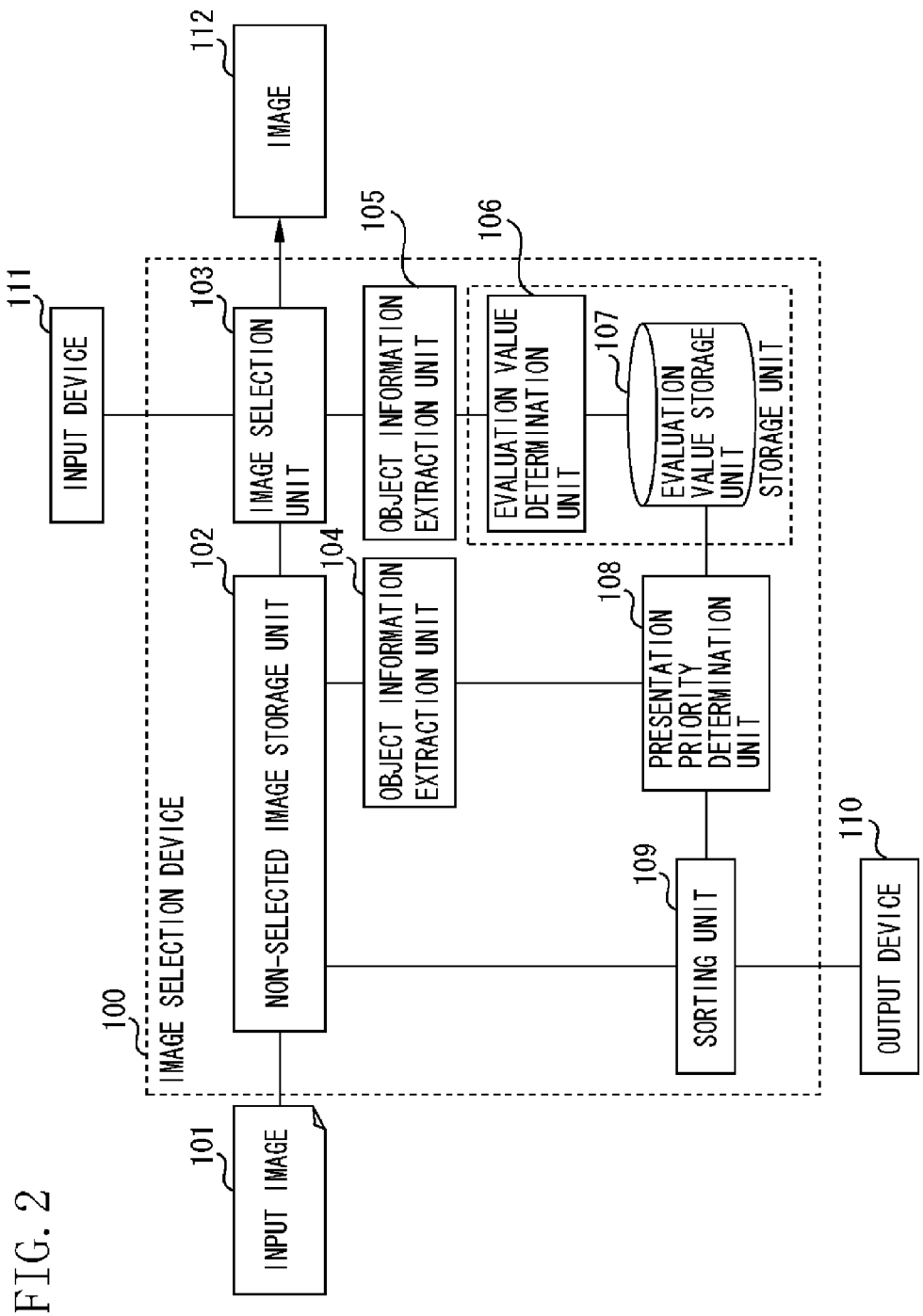
FIG. 2 is a functional configuration diagram of the image selection device according to the first exemplary embodiment of the present invention.
Figure 3:
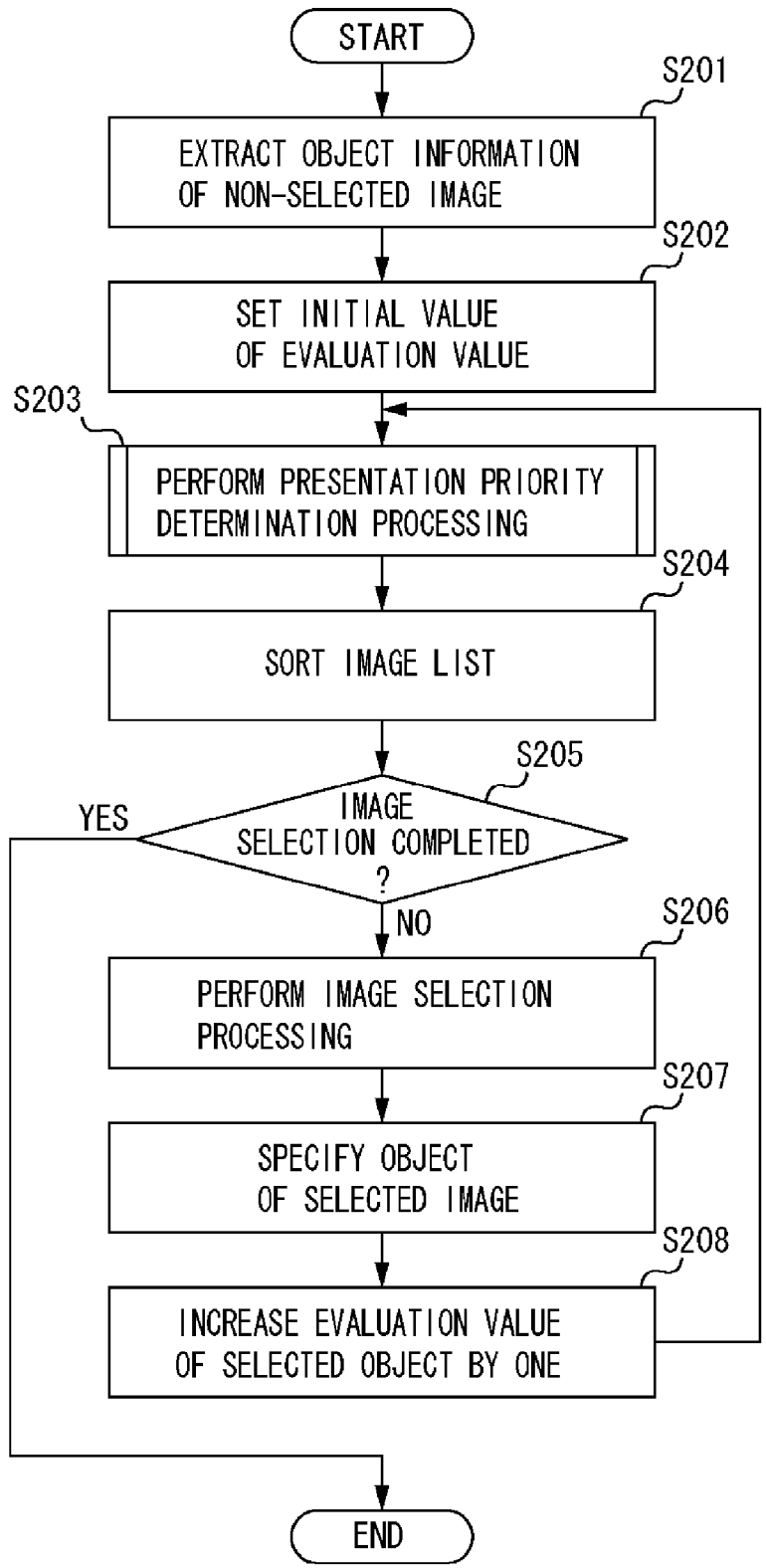
FIG. 3 is a flowchart illustrating image selection processing in the image selection device according to the first exemplary embodiment of the present invention.

FIG. 2 is an example of a functional configuration diagram of an image selection device to which the present invention can be applied. Control of each function is performed by the CPU 2102 of FIG. 1.

An input image 101 may consist of one or more input images. The input image 101 may also store object information as metadata. The term "object information" refers to an attribute indicating information which specifies an object contained in an image, and information about the image such as the object area, the face direction and expression, whether the eyes are closed and the like. In the following description, "attribute information" will be referred to as object information. Further, arbitrary information relating to the object other than information given above may also be treated as object information. Further, the object information does not have to be about a person, it may be about an animal, scenery, a thing and the like.

A non-selected image storage unit 102 stores images among the input images 101 for which selection has not been completed. The non-selected image storage unit 102 is configured by a hard disk drive device for storing images, or a recording medium such as a CD-ROM or a DVD-ROM for presenting various kinds of information to the image processing apparatus.

An image selection unit 103 is a unit for selecting an image from the non-selected image storage unit 102. The selection operation is performed via an input device 111. The input device 111 is a group of buttons, a keyboard, a mouse, a touch panel, a pen, a tablet, a digitizer or the like, which functions as an input interface for inputting the selection instruction of the image into the image selection device.

An object information extraction unit 104 for non-selected images performs processing to extract object information relating to the images in the non-selected image storage unit 102. The extraction may also be performed by providing an image recognition unit and automatically extracting a recognition result, or performed automatically based on stored metadata. Alternatively, the extraction may be performed by the user looking at the images and manually inputting the object information. Further, the extraction may be performed by combining automatic extraction and manual extraction.

An object information extraction unit 105 for selected images performs processing to extract object information about the image selected by the image selection unit 103. The extraction may also be performed by providing an image recognition unit and automatically extracting a recognition result, or performed automatically based on stored metadata. Alternatively, the extraction may be performed by the user looking at the images and manually inputting the object information. Further, the extraction may be performed by combining automatic extraction and manual extraction.

An object evaluation value determination unit 106 performs processing to determine an evaluation value for each value of the object information based on the object information relating to the selected image extracted by the object information extraction unit 105. An evaluation value storage unit 107 is a storage unit for storing the evaluation value determined by the object evaluation value determination unit 106. The evaluation value storage unit 107 is configured by a hard disk drive device for storing various kinds of information, or a recording medium such as a CD-ROM or a DVD-ROM for presenting information about various kinds of information to the image processing apparatus.

A presentation priority determination unit 108 performs processing for determining the presentation priority of the non-selected images based on the object information of the non-selected images extracted by the object information extraction unit 104 and the evaluation values stored in the evaluation value storage unit 107. A sorting unit 109 sorts the non-selected images stored in the non-selected image storage unit 102 based on the presentation priority determined by the presentation priority determination unit 108. An output device 110 is the output device 2108 illustrated in FIG. 1, which is configured of a display device such as a CRT or a liquid crystal display. The output device 110 displays the sorted non-selected images. An image 112 is an output image selected by an image selection device 100 according to the present exemplary embodiment.

Figure 4:
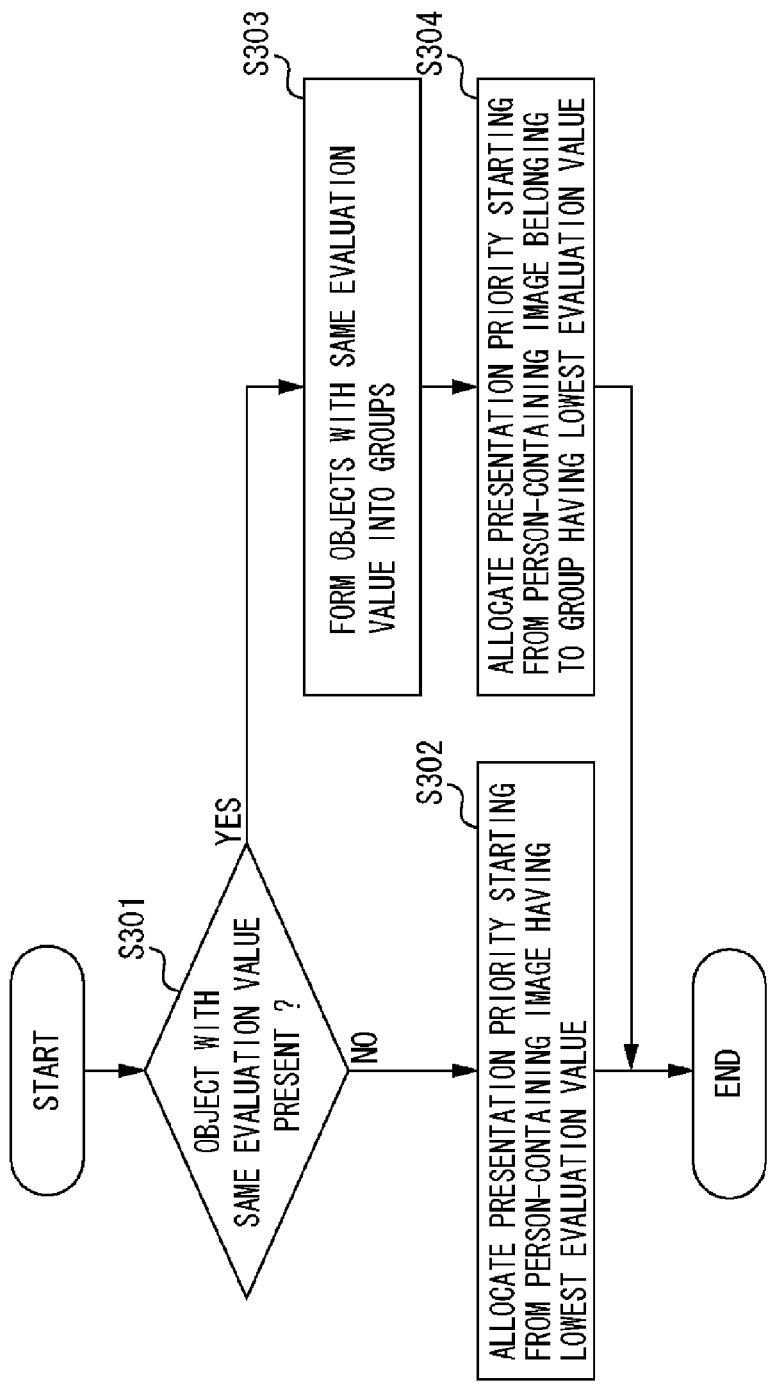
FIG. 4 is a flowchart illustrating presentation priority determination processing in the image selection device according to the first exemplary embodiment of the present invention.
Figure 5:
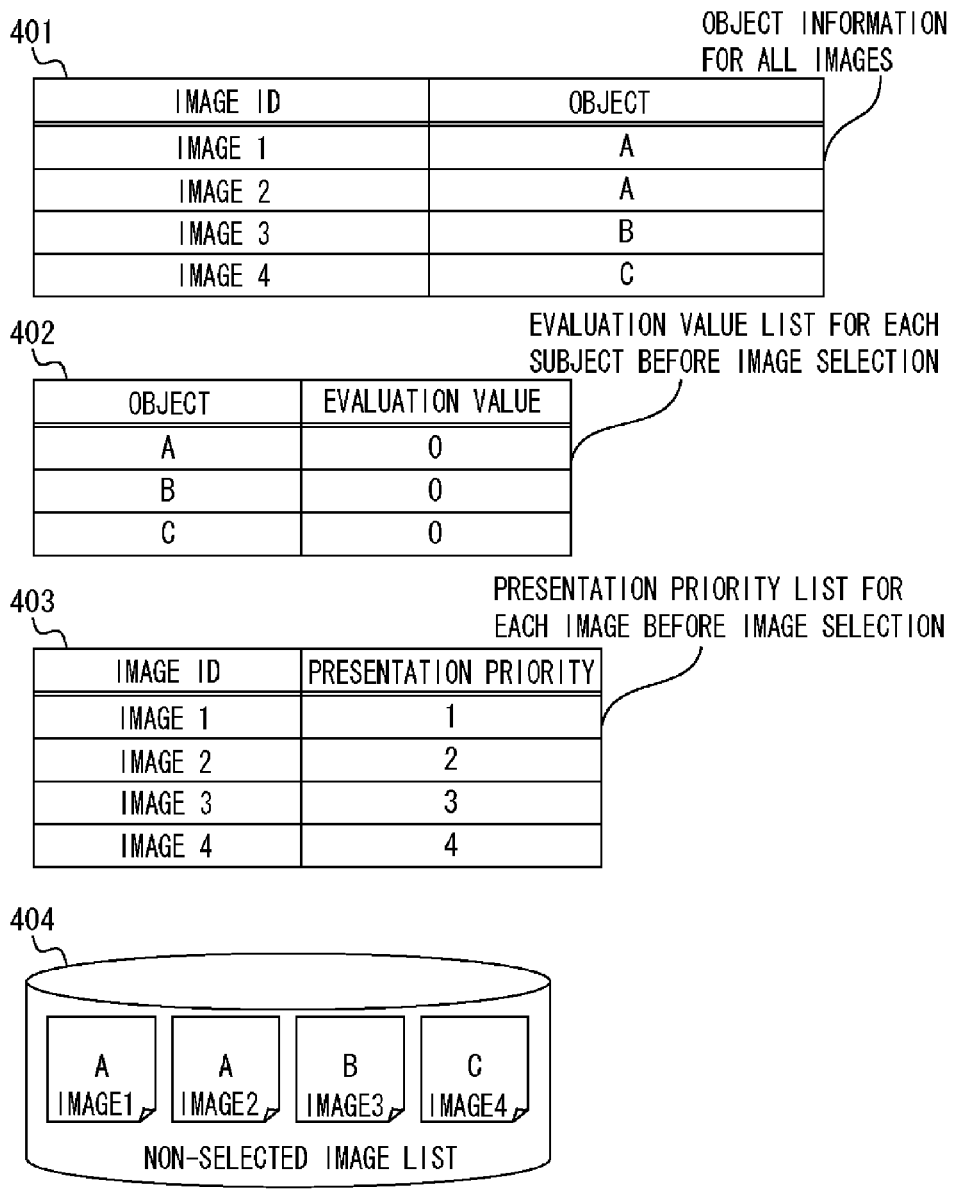
FIG. 5 illustrates a list of various information of the image selection device according to the first exemplary embodiment of the present invention.

Next, the presentation priority determination processing according to the first exemplary embodiment will be described using FIGS. 3 to 6. FIG. 4 is a flowchart illustrating the presentation priority determination processing in an image selection device according to the first exemplary embodiment. FIG. 5 illustrates the state of the images stored in the non-selected image storage unit 102 before selection processing is performed by the image selection unit 103.

In step S201, object information extraction processing of the images stored in the non-selected image storage unit 102 is performed. In the present exemplary embodiment, the four images of from image 1 to image 4 illustrated in item 401 of FIG. 5 are used as the input images. Item 401 illustrates the correspondence relationship between the object information of all of the extracted images and an identification (ID) which uniquely specifies the images. In the present exemplary embodiment, only information for specifying an object contained in an image (hereinafter sometimes referred to as "object") is used as the object information. The information to be set as the object information may be determined by an instruction from the user, or may be determined in advance. Further, while in the present exemplary embodiment, an individual's name A, B, C . . . are used as a value of the information specifying the object and serve as metadata for each image, this information is not limited to an individual's name. Any information may be used as a value of the object as long as it can specify the object. The presentation order before applying the sorting of the present invention is arranged in an ascending numeric order of image ID.

In step S202, an initial evaluation value is set for each value of the information specifying the object. Item 402 of FIG. 5 illustrates an evaluation value list for each value of the information specifying the object. In item 402 of FIG. 5, the initial evaluation value for each value of the information specifying the object before image selection is illustrated. In the present exemplary embodiment, all of the object initial values are set as zero. Each time an image is selected, an evaluation value of one is added to the value of the information specifying the object of that image.

In step S203, processing for determining the presentation priority is performed based on the object information extracted in step S201 and the evaluation values set in steps S202 and S208.

FIG. 4 is a flowchart illustrating in detail the presentation priority determination processing of step S203. In step S301, it is determined whether values of information specifying an object with the same evaluation value are present. If values of information specifying an object with the same evaluation value are not present ("NO" in step S301), in step S302, the presentation priority is allocated from the image having a value of information specifying the object with the lowest evaluation value. In step S301, if a plurality of values of information specifying an object with the same evaluation value is present ("YES" in step S301), in step S303, the values of the information specifying an object with the same evaluation value are treated as a group. In step S304, the presentation priority is allocated from the image having a value of information specifying the object which belongs to the group having the lowest evaluation value. Once the allocation of the presentation priority to the image having a value of information specifying the object which belongs to the group having the lowest evaluation value is completed, the processing continues in such a flow that the presentation priority is then allocated to the image having a value of information specifying the object which belongs to the group having the next lowest evaluation value. In the present exemplary embodiment, regarding the allocation of presentation priority within a group having the same evaluation value, any presentation priority allocation may be performed. In the present exemplary embodiment, when the need arises to allocate presentation priority within a group, the allocation can be determined simply based on the presentation order used before performing the sorting processing.

Item 403 in FIG. 5 is a list of the presentation priorities allocated in the presentation priority determination processing of step S203 using the object information extracted in step S201 and the initial evaluation values set in step S202. This list represents the presentation priorities used before performing the image selection processing.

In step S204, the images stored in the non-selected image storage unit 102 are sorted based on the presentation priority determined in step S203, and displayed by the output device 110. This display may be restricted based on the presentation priority instead of displaying all of the images. Moreover, the display of the images may be such that only the image having the highest presentation priority is displayed, or only images having a certain presentation priority or greater are displayed. If the images do not fit to one screen, just images which fit to the screen may be displayed in order starting from an image with the highest presentation priority. A result of sorting based on the presentation priority determined in step S203 looks like item 404 in FIG. 5. The images are displayed in order starting from the image having the smallest presentation priority number.

The processing flow from step S203 to step S208 is repeated each time when an image is selected until either in step S205 there are no more selection candidate images, or it is determined to end image selection. When it is determined in step S205 that image selection is completed ("YES" in step S205), the processing ends. If the determination is a "NO" in step S205, the processing proceeds to step S206.

Figure 6:
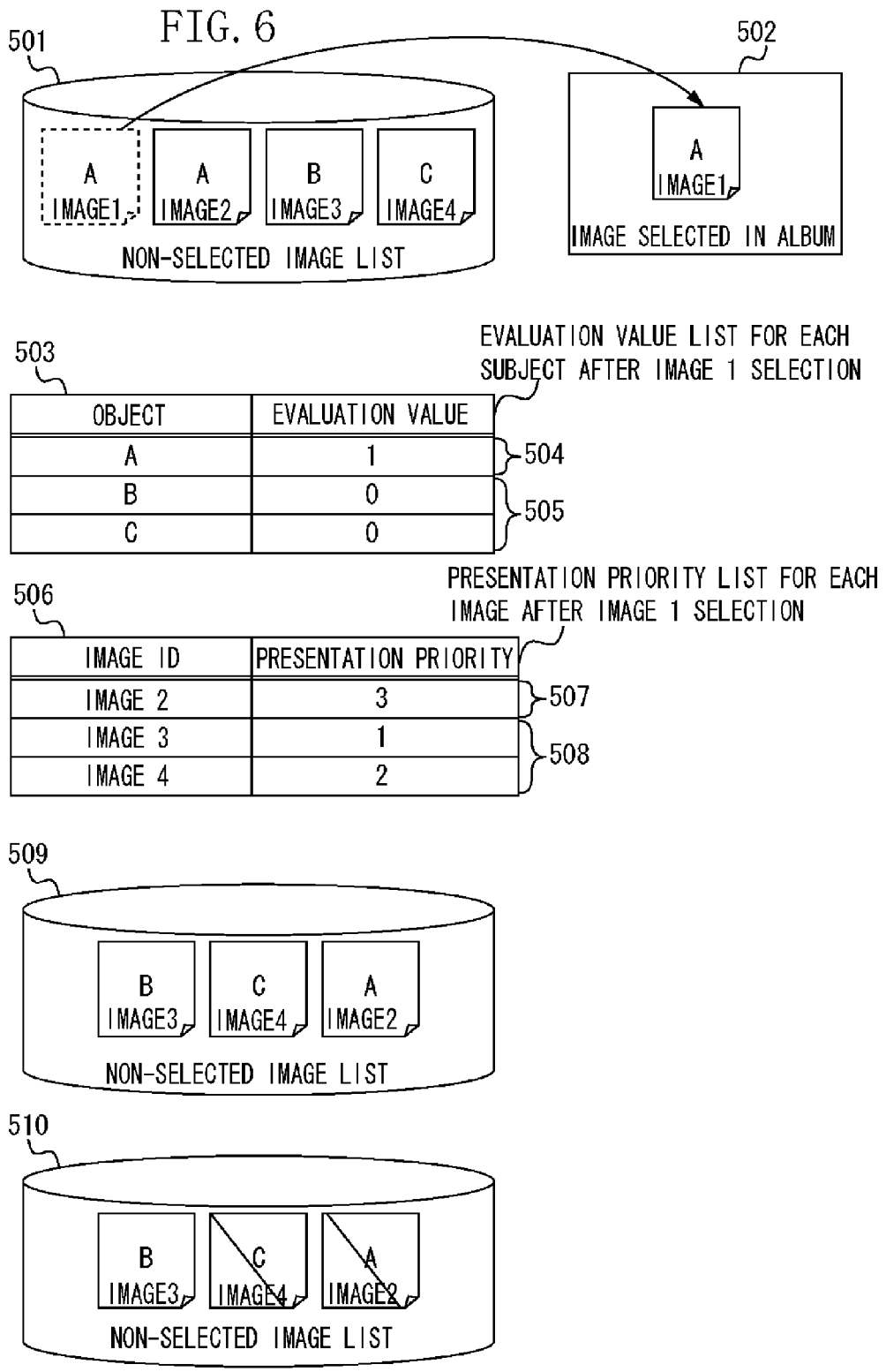
FIG. 6 illustrates the processing which is performed when an image is selected according to the first exemplary embodiment of the present invention.

The processing in step S206 is performed when an image is selected by the image selection unit 103. FIG. 6 illustrates processing performed when an image is selected. In the present exemplary embodiment, as illustrated in item 501 of FIG. 6, a case is described in which an image 1 is selected in a one-page album (item 502). More specifically, in the processing performed at this stage, if an image from the selected non-selected image list is arranged in the selected image list or in the album, the original image is deleted and copied to an arrangement destination.

In step S207, the object information of the image selected in step S206 is specified. In the present exemplary embodiment, the object information to be identified is information which specifies the object. Thus, the object information to be extracted from image 1 is A as a value of the information specifying the object. In step S208, an evaluation value is allocated based on the information extracted in step S207. In item 503 of FIG. 6, the evaluation value after an image is selected is illustrated for each value of the information which specifies the object. Since image 1 which contains object A was selected in item 502, "1" is allocated as the evaluation value for object A.

The processing then returns to step S203, and the processing for determining the presentation priority of the images is performed based on the object information extracted in step S201 and the evaluation values set in step S208. As illustrated in item 505, since two people, object B and object C, are present as objects having an evaluation value of zero, the two people are formed into a group having an evaluation value of zero. Therefore, images which contain object B or object C are similarly prioritized without distinguishing between them. As illustrated in item 506, since priority is given to the presentation order used before performing the sorting processing within a group having the same evaluation value, image 3 has presentation priority 1 and image 4 has presentation priority 2 (item 508).

Further, as illustrated in item 504, image 2, which is an image containing A that has an evaluation value of 1, has presentation priority 3 (item 507). When performing the presentation priority determination processing of step S203, object information concerning the images of the non-selected image list is utilized. This object information of the non-selected images may be stored by preparing a storage unit and storing the object information extraction result of the non-selected images in step S201, or extracted each time a selection is made.

In step S204, the non-selected images are sorted as illustrated in item 509 by sorting the images based on the presentation priority illustrated in item 506. Further, a restriction may be imposed so that only the image with the highest presentation priority is displayed, as illustrated in item 510. Here, only image 3, which has the highest presentation priority, is displayed, and images 4 and 2 are restricted.

Thus, in the first exemplary embodiment, display is performed using a presentation priority determined each time a selection is made. Consequently, user operations can be alleviated while realizing a display which is close to the user's preference.

In the first exemplary embodiment, only information specifying an object was used as the object information. In a second exemplary embodiment, as an example of combining multiple pieces of object information, the facial area of the object is additionally used as the object information. More specifically, in the second exemplary embodiment, by giving consideration even to the appearance area in the album, a more even impression for each object can be achieved. Consequently, a poorly balanced selection of two images in which one person is shown in a large size, while the other person is shown in a small size, can be avoided. An example will now be illustrated for determining the presentation priority using multiple pieces of object information.

Figure 7:
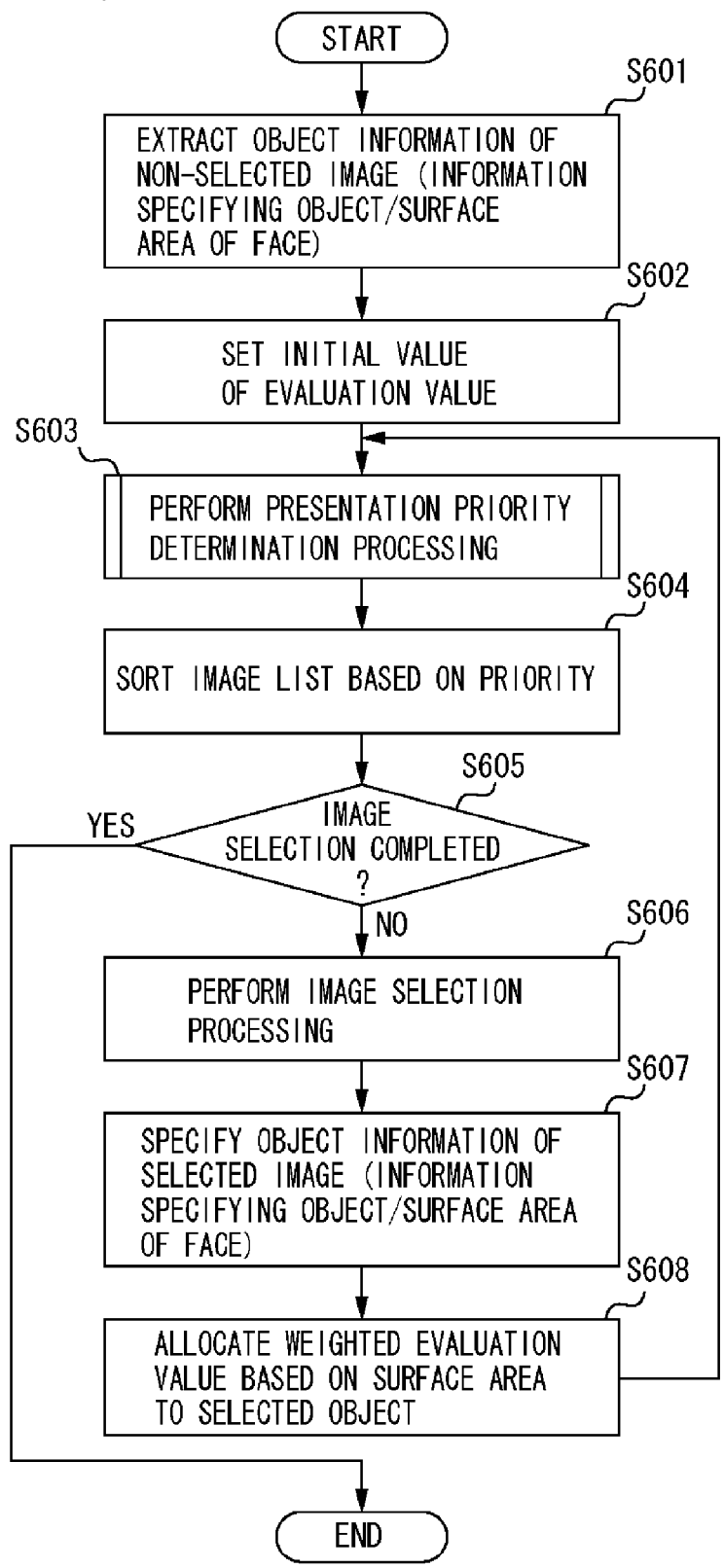
FIG. 7 is a flowchart illustrating image selection processing in an image selection device according to a second exemplary embodiment of the present invention.
Figure 8:
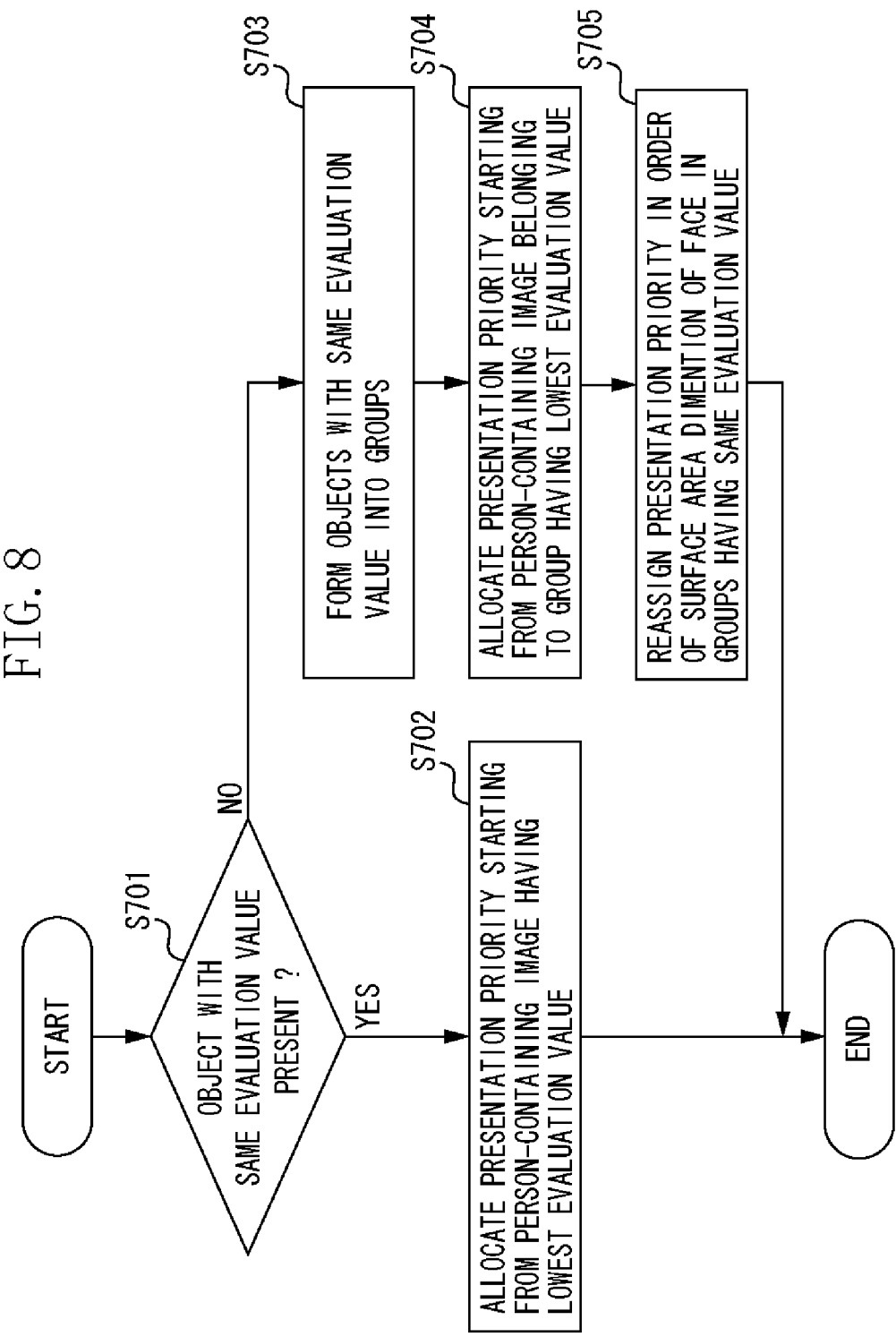
FIG. 8 is a flowchart illustrating presentation priority determination processing in the image selection device according to the second exemplary embodiment of the present invention.
Figure 9:
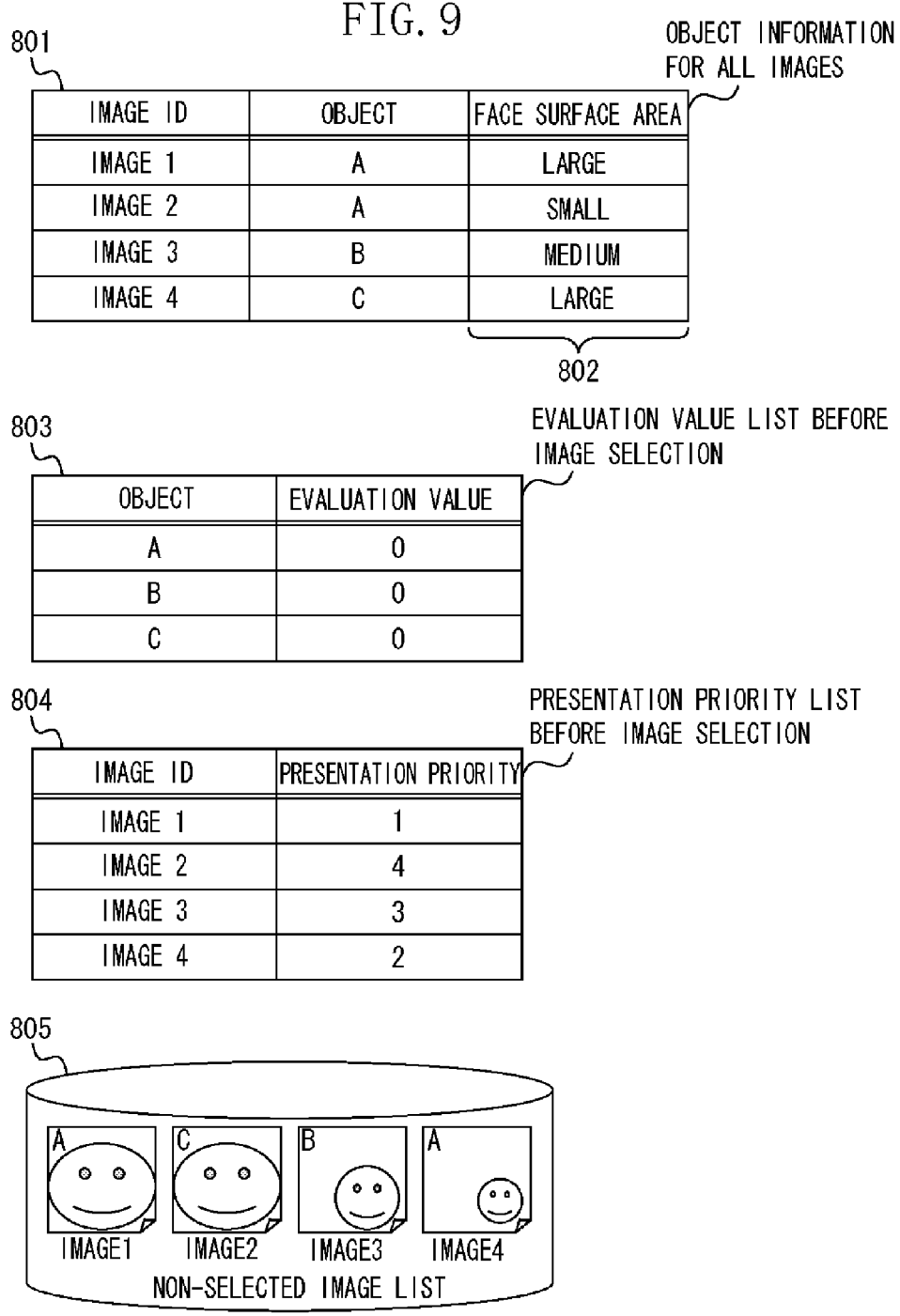
FIG. 9 illustrates a list of various information of the image selection device according to the second exemplary embodiment of the present invention.

FIG. 7 is a flowchart illustrating the overall flow of the second exemplary embodiment. FIG. 8 is a flowchart illustrating in detail the presentation priority determination processing of step S603. In the present exemplary embodiment, the four images, from image 1 to image 4, illustrated in item 801 of FIG. 9 are used as the input images. Also, in the present exemplary embodiment, the basic configuration of the image selection device is the same as the configuration described using FIGS. 1 and 2, and thus a description thereof will be omitted here.

In step S601, like in the first exemplary embodiment, the object information of all of the images stored by the non-selected image storage unit 102 is extracted. In the first exemplary embodiment, only the information specifying the object was used. However, in the second exemplary embodiment, information about the facial area of the object is also used for the object information. In the present exemplary embodiment, an individual's name and facial area are allocated as values of the object information in the metadata, and the object information is acquired from that metadata. Not only is the metadata extracted by the extraction unit. The object information may also be acquired by some other way, such as by image recognition or the like.

Item 801 of FIG. 9 illustrates the correspondence relationship between the object information of all the extracted images and the ID of the images. As illustrated in item 802 of FIG. 9, the present exemplary embodiment classifies facial areas into three levels on a relative basis of large, medium, and small. However, the value of the area itself may also be used, and the area may be classified into any number of levels. Like in the first exemplary embodiment, the arrangement order before the present invention is used, is ascending order of image ID.

In step S602, like in step S203 of the first exemplary embodiment, an initial evaluation value is set for each value of the information specifying the object. In the present exemplary embodiment too, before selecting the image, the initial values are each set to zero. In the presentation priority determination processing step S603, processing for determining the presentation priority is performed based on the object information extracted in step S601 and the evaluation values set in steps S602 and S608.

In step S701 of FIG. 8, it is determined whether objects having the same evaluation value are present. If values of information specifying an object with the same evaluation value are not present ("NO" in step S701), in step S702, the presentation priority is allocated from the image containing the object with the lowest evaluation value.

If a plurality of images containing the same object is present ("YES" in step S701), the presentation priority determination is performed utilizing facial area. In this case, the presentation priority is allocated in ascending order of facial area. In step S703, if objects with the same evaluation value are present, the objects with the same evaluation value are formed into a group.

In step S704, the presentation priority is allocated from the image containing the object which belongs to the group having the lowest evaluation value. When the allocation of presentation priority containing the object which belongs to the group having the lowest evaluation value is completed, the processing continues in such a flow that the presentation priority is then allocated to the image containing the object which belongs to the group having the next lowest evaluation value.

Item 804 of FIG. 9 illustrates a list of the presentation priorities determined in step S603 using the evaluation values of item 803. Like images 1 and 4, if no difference can be found in the presentation priority even after the above-described processing is performed, the presentation priority is allocated based on the presentation order used before performing the sorting processing. In this example, image 1 has presentation priority 1, and image 4 has presentation priority 4.

In step S604, the images stored in the non-selected image storage unit 102 are sorted based on the presentation priority determined in step S603. The result of the sorting using the presentation priority of item 804 in FIG. 9 looks like item 805. The images are displayed in ascending order of the image from the smallest presentation priority number. It can be seen that the images are arranged in order of facial size, because before selecting the image, a presentation priority allocation based on the evaluation value could not be performed.

Like in the first exemplary embodiment, the processing flow from step S603 to step S608 is repeated each time an image is selected until either in step S605 there are no more selection candidate images, or it is determined to end image selection. When it is determined in step S605 that image selection is completed ("YES" in step S605), the processing ends. When it is determined in step S605 that image selection is not completed ("NO" in step S605), the processing proceeds to step S606.

In step S606, like in step S206 of the first exemplary embodiment, image selection processing suitable for the present exemplary embodiment is performed. In the present exemplary embodiment, as illustrated in item 901 of FIG. 10, a case is described where image 4 is selected for a one-page album.

In step S607, the object information of the image selected in step S606 is extracted. In the present exemplary embodiment, the object information to be extracted is information which specifies the object and information about the facial area of the object. Here, the value of the information specifying the object is "C", and the value of the facial area is "large". In step S608, an evaluation value is allocated to the object based on the information extracted in step S607.

Figure 10:
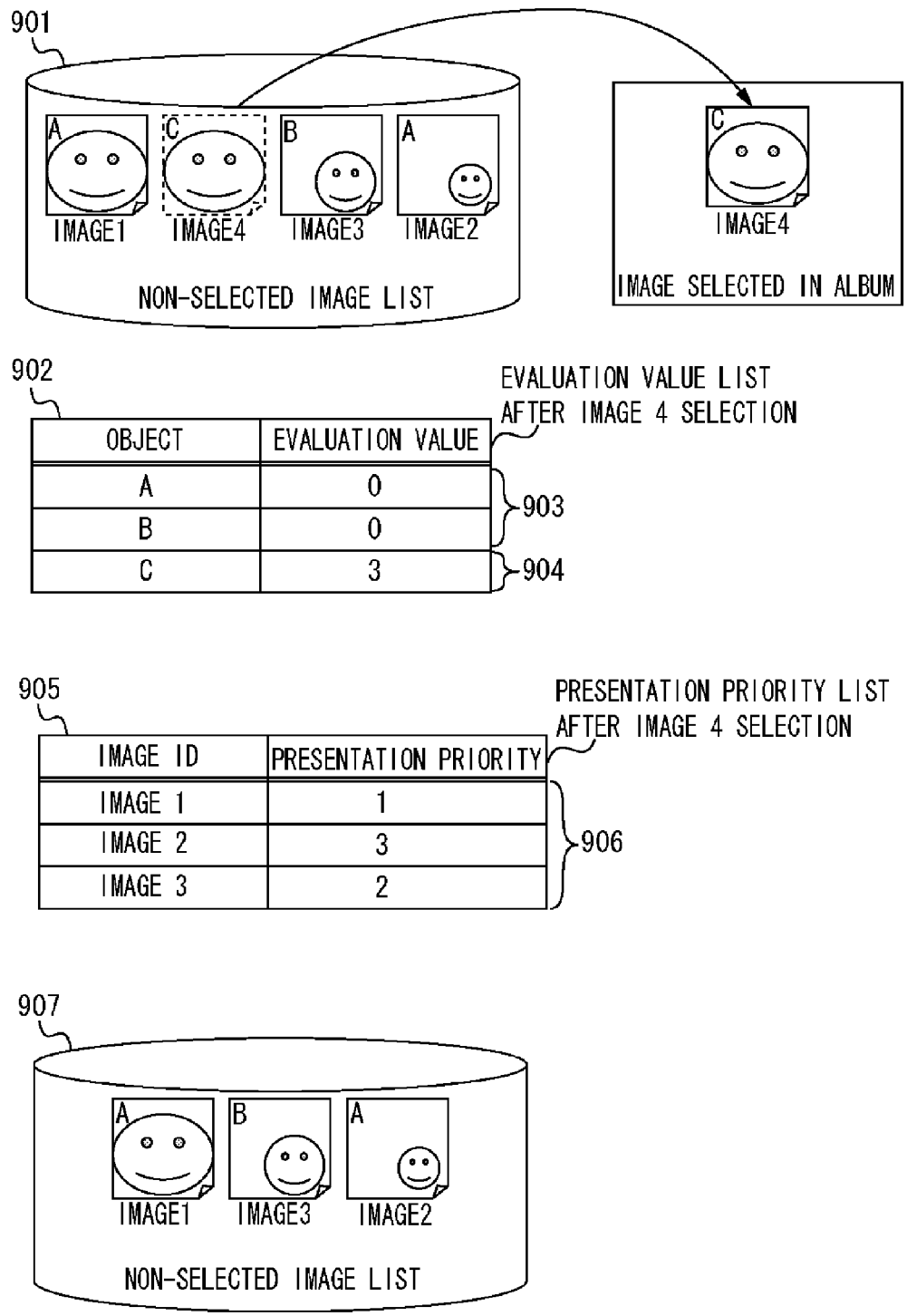
FIG. 10 illustrates the processing which is performed when an image is selected according to the second exemplary embodiment of the present invention.

In item 902 of FIG. 10, an evaluation value after image selection is illustrated for each value of the information specifying the object. The evaluation value weighting based on facial area is performed by changing the evaluation value based on facial size, with large being 3, medium being 2, and small being 1. Therefore, as illustrated in item 904, "3" is allocated as the evaluation value for C.

The processing then returns to step S603, and the processing for determining the presentation priority of the images is again performed. Item 905 of FIG. 10 is a list of the presentation priorities determined using the object information of item 902. As illustrated in item 903, since two people, object A and object B, are present as objects having an evaluation value of zero, the two people are considered as a group having an evaluation value of zero. Therefore, images which contain object A or object B are prioritized. Further, within a group having the same evaluation value, the presentation priority is allocated in ascending order of size of the imaged face. Thus, image 1 has presentation priority 1 and image 3 has presentation priority 2. Further, as illustrated in item 904, image 2, which contains object C with an evaluation value of 3, has presentation priority 3 (item 906).

During this presentation priority determination processing of step S603 too, object information about the non-selected images is utilized. Like in the first exemplary embodiment, the result of the object information extraction of the non-selected images in step S601 may be stored, or object information is re-extracted each time an image is selected.

In step S604, the non-selected images are sorted as illustrated in item 907 by sorting the images based on the presentation priority illustrated in item 905.

In the present exemplary embodiment, the information specifying the object and the size of the displayed facial area were used as the object information. However, information about the displayed total body area, how much a person is smiling, and the number of people included in an image may also be used. Further, non-quantitative information, such as information about face direction and whether a person is blinking may also be used. If the information is the face direction, such information may be handled by independently classifying into multiple grades like front, oblique, side and the like.

Further, in step S702, if a plurality of the same object is present, the presentation priority may be determined in even more detail using the above-described multiple pieces of object information. In step S705 too, within a group having the same evaluation value, when determining the presentation priority in even more detail, the presentation priority may be determined in even more detail using the above-described multiple pieces of object information.

Thus, a more even impression for each object can be obtained by determining the presentation priority using multiple pieces of object information.

In the first exemplary embodiment and the second exemplary embodiment, a method for determining the presentation priority and sorting based on the presentation priority were described when one image is selected. However, the present invention can also be applied when returning an already-selected image into the non-selected image storage unit. In a third exemplary embodiment, an example is illustrated in which the presentation priority is changed based on a returned image, when a single selected image is returned to a non-selected image storage unit.

In the present exemplary embodiment too, the basic configuration of the image selection device is the same as the configuration described using FIGS. 1 and 2, and thus a description thereof will be omitted here.

Figure 11:
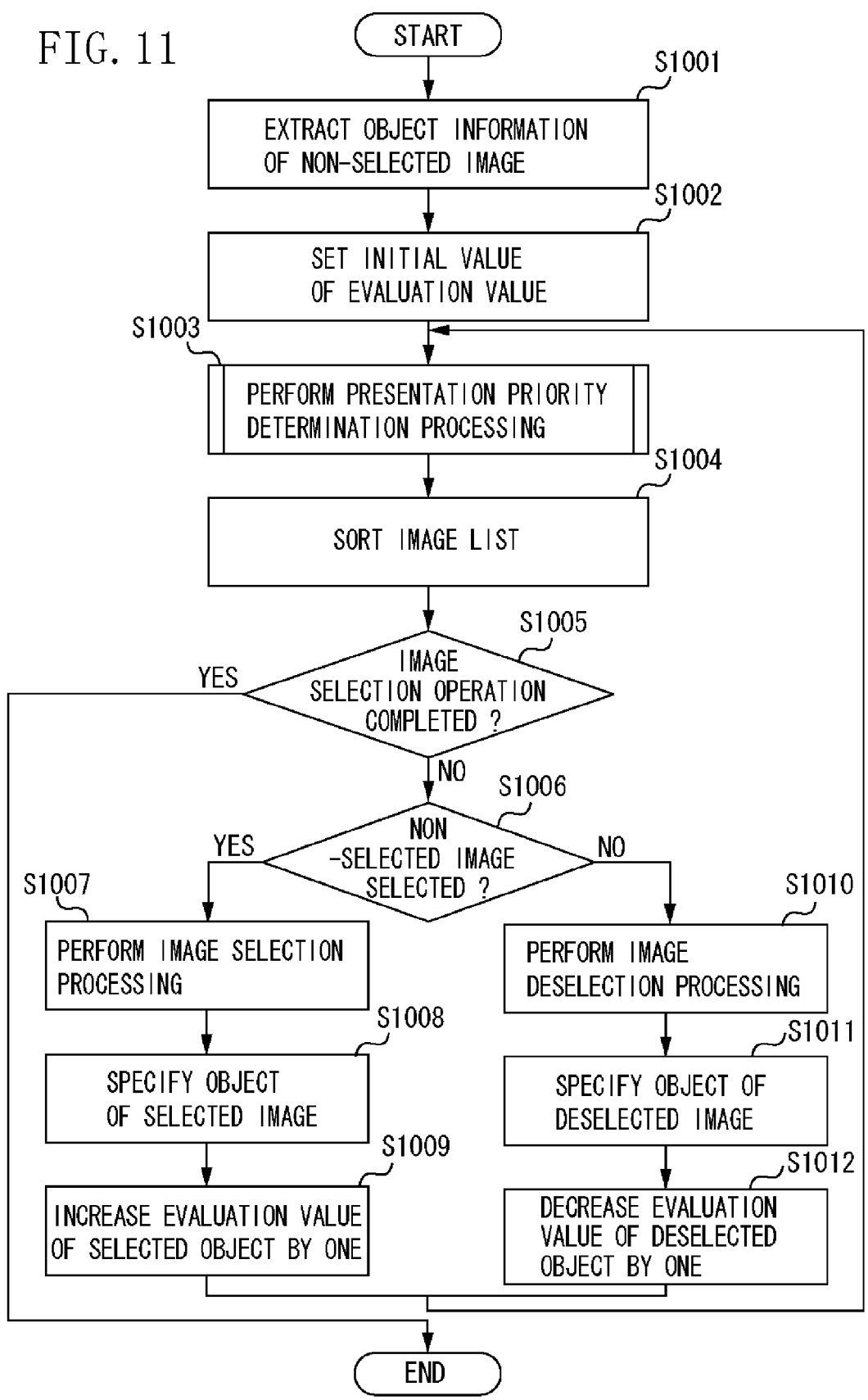
FIG. 11 is a flowchart illustrating image selection processing in an image selection device according to a third exemplary embodiment of the present invention.
Figure 13:
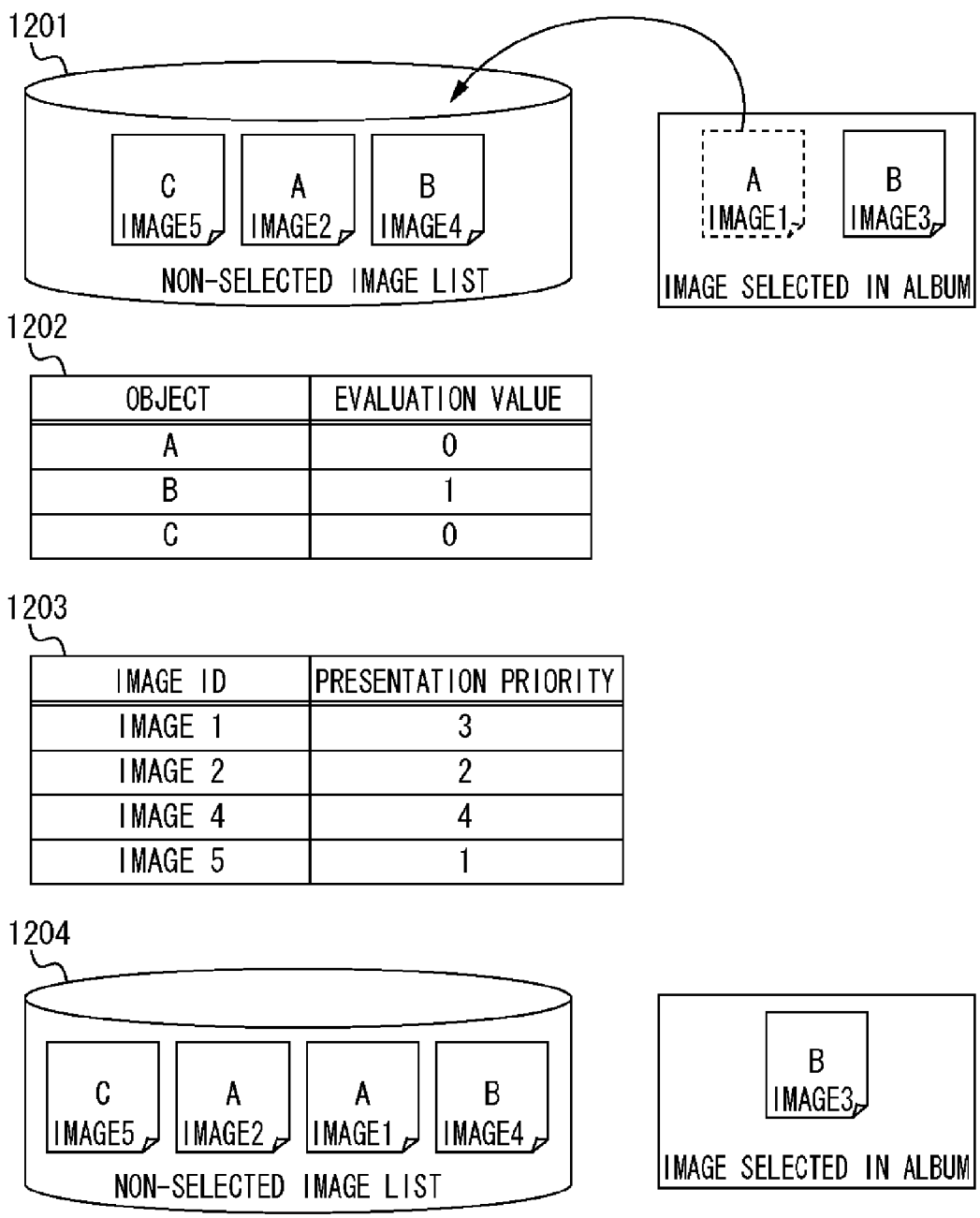
FIG. 13 illustrates the processing which is performed when an image is selected according to the third exemplary embodiment of the present invention.

FIG. 11 is a flowchart illustrating the overall flow of the processing according to the third exemplary embodiment. The details of the presentation priority determination processing of step S1003 are the same as in the flowchart of FIG. 4. In the present exemplary embodiment, the five images, from image 1 to image 5, illustrated in item 1101 of FIG. 12 are used as the input images. In step S1001, like in step S201 of the first exemplary embodiment, the object information is extracted. Item 1101 of FIG. 12 illustrates the image IDs for all the images and the object information. Like in the first exemplary embodiment, in the present exemplary embodiment too, only information specifying the object is used as the object information.

In step S1002, like in step S202 of the first exemplary embodiment, an initial value which is suitable for the present exemplary embodiment is set. In the present exemplary embodiment too, the initial value for all the objects is set as zero. In step S1003, like in step S203 of the first exemplary embodiment, a presentation priority suitable for the present exemplary embodiment is determined according to the flowchart of FIG. 4, based on the object information of the non-selected images extracted in step S1001 and the evaluation values set in step S1002, or in steps S1009 and S1012.

In step S1004, like in step S204 of the first exemplary embodiment, sorting is performed by a presentation order suitable for the present exemplary embodiment based on the presentation priority determined in step S1003. In step S1005, like in step S205 of the first exemplary embodiment, it is determined whether to continue or to end the selection operation of the images. If it is determined not to end the processing ("NO" in step S1005), the processing proceeds to step S1006. If it is determined to end the processing ("YES" in step S1005), the processing is ended.

In step S1006, as the image selection operation, it is determined whether to select an image from the non-selected image list, or to return an image from among already-selected images to the non-selected images. If a non-selected image is selected ("YES" in step S1006), the processing proceeds to step S1007. If a non-selected image is not selected ("NO" in step S1006), the processing proceeds to step S1010. In step S1007, like in step S206 of the first exemplary embodiment, image selection processing suitable for the present exemplary embodiment is performed. In the present exemplary embodiment, first, image 1 is selected, and image 3 is selected during the second selection. In step S1008, like in step S207 of the first exemplary embodiment, the object information of the selected image is specified.

In step S1009, like in step S208 of the first exemplary embodiment, an evaluation value suitable for the present exemplary embodiment is allocated to each object. The object information of item 1102 and the presentation priority list of the images in item 1103 are values for a case where the processing of the first exemplary embodiment is applied to all of the images illustrated in item 1101, and images are selected in the album in the order of image 1 and image 2. As illustrated in item 1105, image 1, which contains object A, and image 3, which contains object B, are selected. Therefore, as illustrated in item 1102, "1" is allocated as the evaluation value to both the objects A and B. Further, among the non-selected images, only image 5 is an image which contains an object having an evaluation value of zero. Thus, image 5 has presentation priority 1. Image 2 and image 3 contain A and B, which are objects having an evaluation value of 1. Therefore, the default arrangement order is preferentially chosen, so that image 2 has presentation priority 2, and image 3 has presentation priority 3. The presentation order of item 1104 is determined by this flow.

In step S1010, processing for returning one image from a selected state to a non-selected state is performed. As illustrated in item 1201, in the present exemplary embodiment, an example of returning image 1 to the non-selected image list will be described. More specifically, this processing is carried out by placing the currently selected image in the non-selected image list, then deleting the image from the list of selected images, and copying the image into the list of non-selected images.

In step S1011, the object information of the image which has been returned to the non-selected image list is extracted. In the present exemplary embodiment, the value of the information specifying the object included in the returned image is information "A". In step S1012, processing for reducing the evaluation value of the object included in the image which has been returned to the non-selected image list, is performed. In the present exemplary embodiment, if an image is selected, 1 is added to the evaluation value of the object included in that image. If an image is deselected, 1 is subtracted from the evaluation value of the object included in that image. Therefore, processing for reducing the evaluation value of object A is performed.

A list of the evaluation values changed in step S1012 is illustrated in item 1202. A comparison with item 1102 shows that the evaluation value of A has changed from 1 to 0. Based on the evaluation value illustrated in item 1202, as illustrated in item 1203, the presentation priority is determined by performing the presentation priority determination processing of step S1003. Further, using the presentation priority determined in step S1203, as illustrated in item 1204, the image is presented by performing the sorting of step S1004. The processing of selecting and deselecting the images is repeated each time one image is selected or deselected until the image selection operation of step S1005 is completed.

Thus, a display can be realized which is close to the user's preference even when a selected image is returned.

In the first and second exemplary embodiments, examples were described in which an image is selected from all of the non-selected images so that the number of appearances or the appearance area is even. In a fourth exemplary embodiment, an example is described in which only an image which satisfies specific conditions can be preferentially selected. In the example of a school album, there may be a page, such as a "class page", in the album where it is desirable to select only a photograph for each class. By applying the present exemplary embodiment, only the image of a person belonging to a specific class can be preferentially presented. As an example, a case will be described here of selecting the image of Class 1 in a school album. In the present exemplary embodiment too, the basic configuration of the image selection device is the same as the configuration described using FIGS. 1 and 2, and thus a description thereof will be omitted here.

Figure 14:
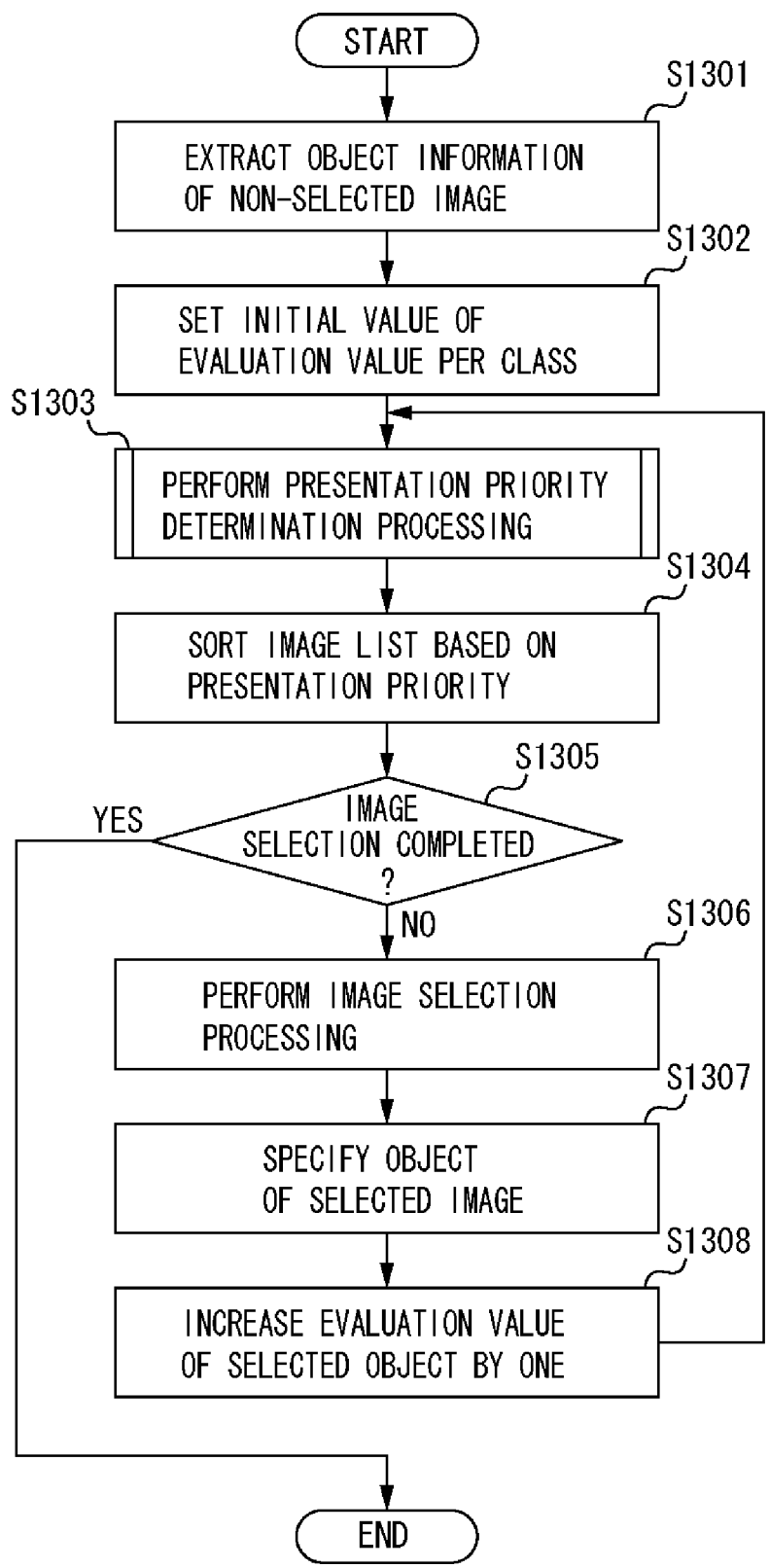
FIG. 14 is a flowchart illustrating image selection processing in an image selection device according to a fourth exemplary embodiment of the present invention.
Figure 15:
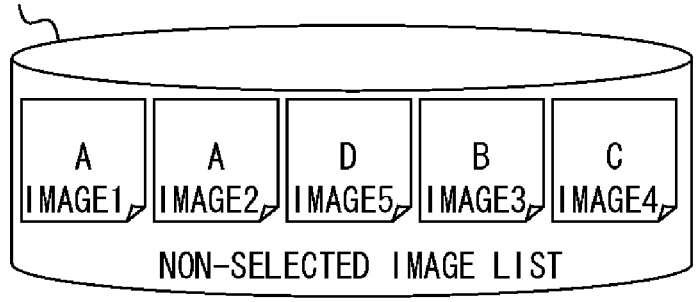
FIG. 15 illustrates a list of various information according to the fourth exemplary embodiment of the present invention.
Figure 16:
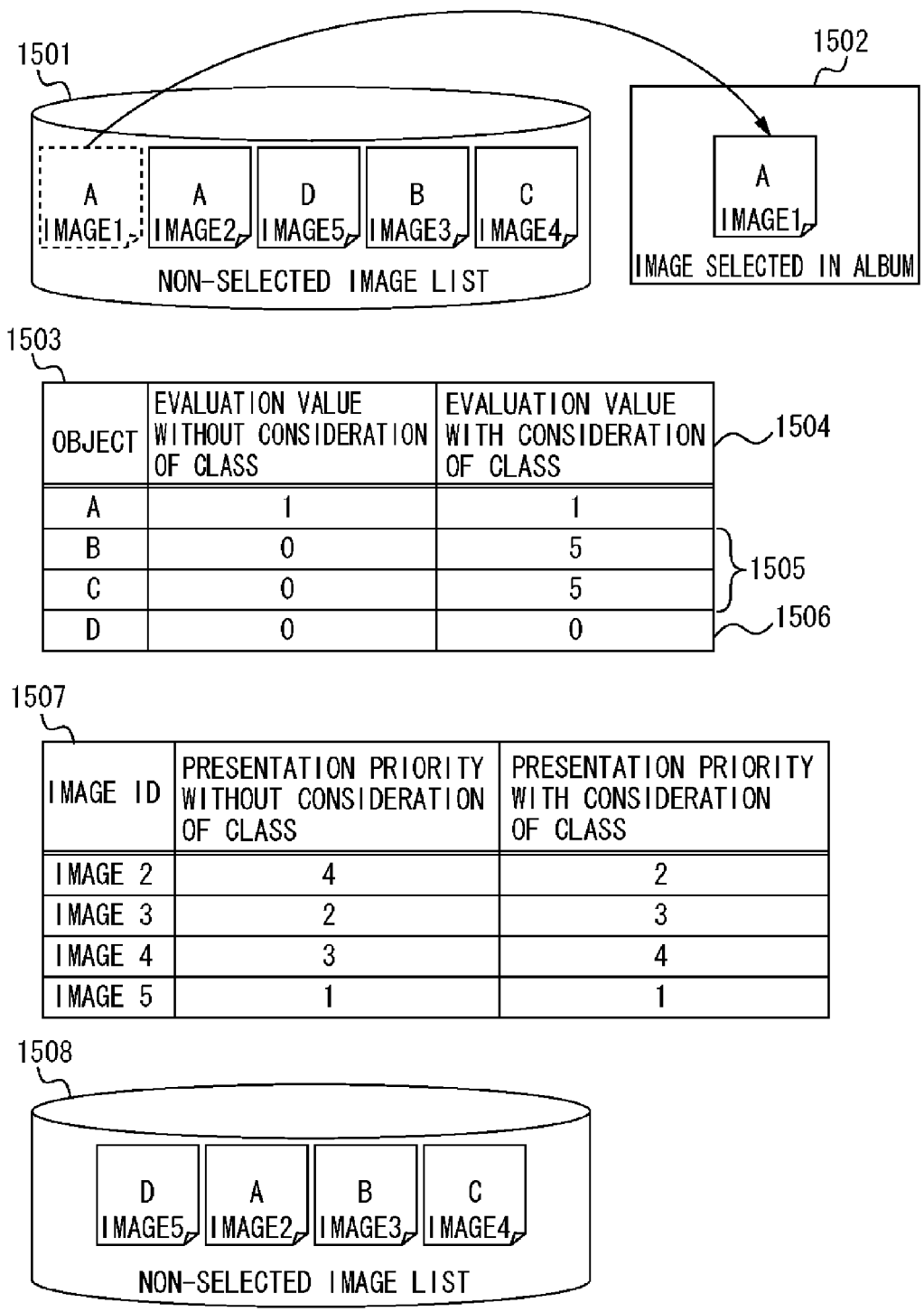
FIG. 16 illustrates the processing which is performed when an image is selected according to the fourth exemplary embodiment of the present invention.

FIG. 14 is a flowchart illustrating the overall flow of the processing according to the fourth exemplary embodiment. The details of the presentation priority determination processing of step S1303 are the same as in the flowchart of FIG. 4. In the present exemplary embodiment, the five images, from image 1 to image 5, illustrated in item 1401 of FIG. 15 are used as the input images. In step S1301, like in step S201 of the first exemplary embodiment, the object information is extracted. In the fourth exemplary embodiment, information specifying the object and the class to which the object belongs are used as the object information to be extracted.

In step S1302, the initial evaluation value is set. If a greater evaluation value is allocated to non-target images than to the target image, the presentation priority of the non-target images decreases. Thus, when selecting the image of Class 1, evaluation values are allocated only to the classes other than Class 1. In the present exemplary embodiment, as illustrated in the initial evaluation value list of item 1402, "5" is allocated as the evaluation value of the total number of images (item 1403).

In step S1303, like in step S203 of the first exemplary embodiment, presentation priority determination processing suitable for the present exemplary embodiment is performed based on the evaluation values set in steps S1302 and S1308. The presentation priority determined using the initial evaluation value is illustrated in item 1404. In step S1304, like in step S204 of the first exemplary embodiment, sorting suitable for the present exemplary embodiment is performed based on the presentation priority determined in step S1303. Item 1405 illustrates a list of the non-selected images sorted using the presentation priority list of item 1404. As illustrated in item 1404, images 3 and 4, which contain B and C, have a lower presentation priority, and thus are arranged at the end of the non-selected image list.

The image selection processing is repeated each time an image is selected until the image selection operation in step S1305 is completed. When it is determined in step S1305 that image selection is completed ("YES" in step S1305), the processing ends. When it is determined in step S1305 that image selection is not completed ("NO" in step S1305), the processing proceeds to step S1306. In step S1306, like in step S206 of the first exemplary embodiment, image selection processing suitable for the present exemplary embodiment is performed. In the present exemplary embodiment, as illustrated in item 1501, a case is described where image 1 is selected.

In step S1307, like in step S207 of the first exemplary embodiment, the object information of the selected image is extracted. The information to be extracted here is information that the object contained in image 1 is "A", and information that the object belongs to Class 1. In step S1308, like in step S208 of the first exemplary embodiment, processing is performed to allocate an evaluation value to the object contained in the selected image. In this example, "1" is allocated as the evaluation value to object A. The evaluation value list for each object is illustrated in item 1503. As illustrated in item 1504, since object A belongs to Class 1, and the image is selected, the evaluation value is 1. As illustrated in item 1505, while the images are not selected, since objects B and C do not belong to Class 1, they have an evaluation value of 5. Further, as illustrated in item 1506, since object D belongs to Class 1, and has not been selected even once, the evaluation value is zero.

Using the evaluation value list 1503 set in step S1308, the presentation priority list determined by the presentation priority determination processing of step S1303 is illustrated in item 1507. Using the presentation priority list of item 1507, the result of the sorting performed in step S1304 is illustrated in item 1508. Image 5, which contains object D, has presentation priority 1, and image 2, which contains object A, has presentation priority 2. Images 3 and 4, which contain objects B and C, have a low presentation priority despite the fact that neither has been selected yet, because the evaluation values are first allocated to images which are not of Class 1.

Thus, only an image which satisfies specific conditions can be preferentially selected.

In the first to fourth exemplary embodiments, the presentation priority was determined, and then all of the images were individually sorted and presented based on the determined presentation priority. In the present exemplary embodiment, a case will be described where multiple images are handled together when sorting the images. By handling multiple images together (e.g., handling a horizontal row of an image cluster to be presented), a presentation can be more easily viewed than a presentation whose presentation order is always updated for each image.

Figure 17:
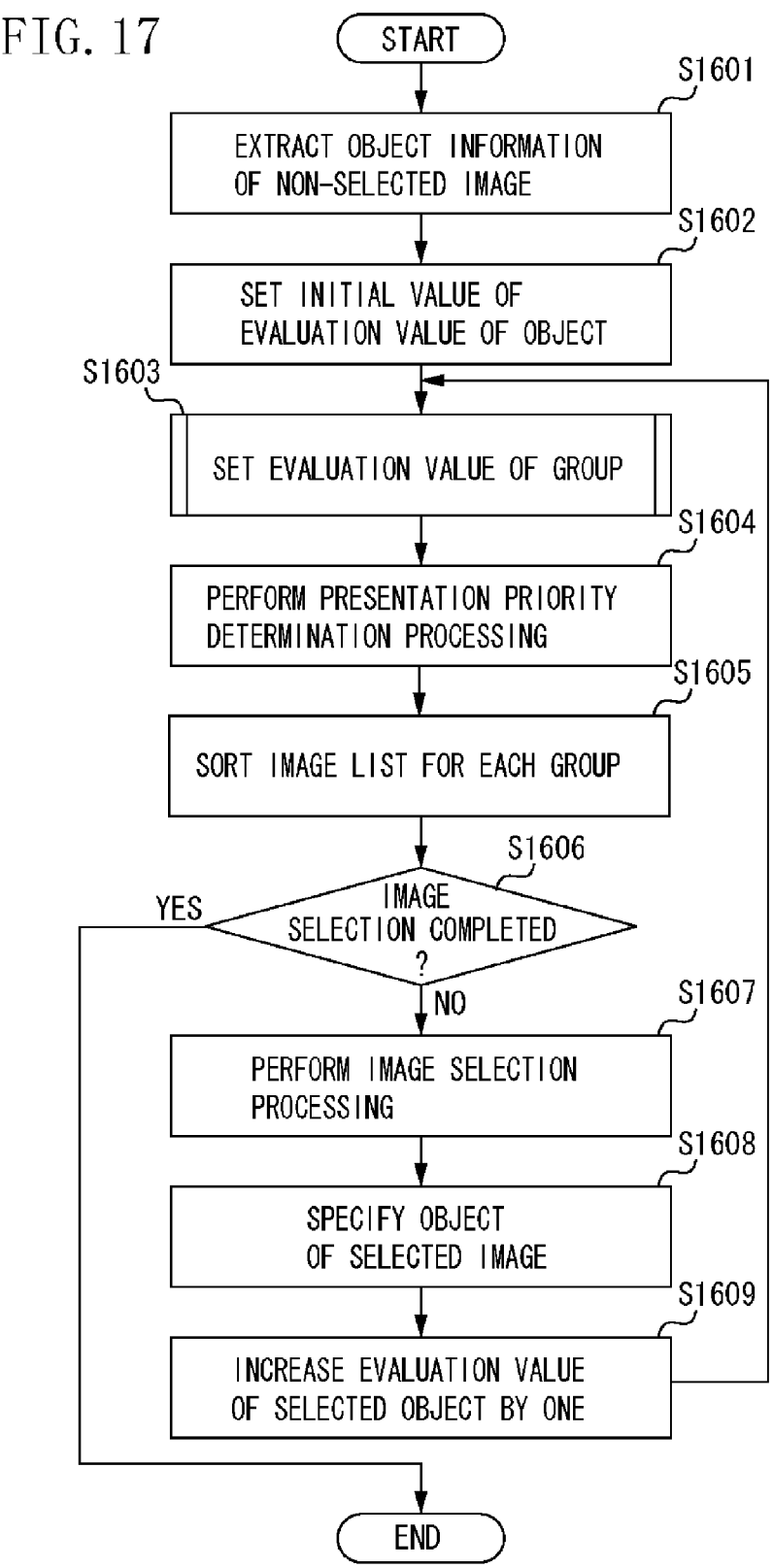
FIG. 17 is a flowchart illustrating image selection processing in an image selection device according to a fifth exemplary embodiment of the present invention.
Figure 18:
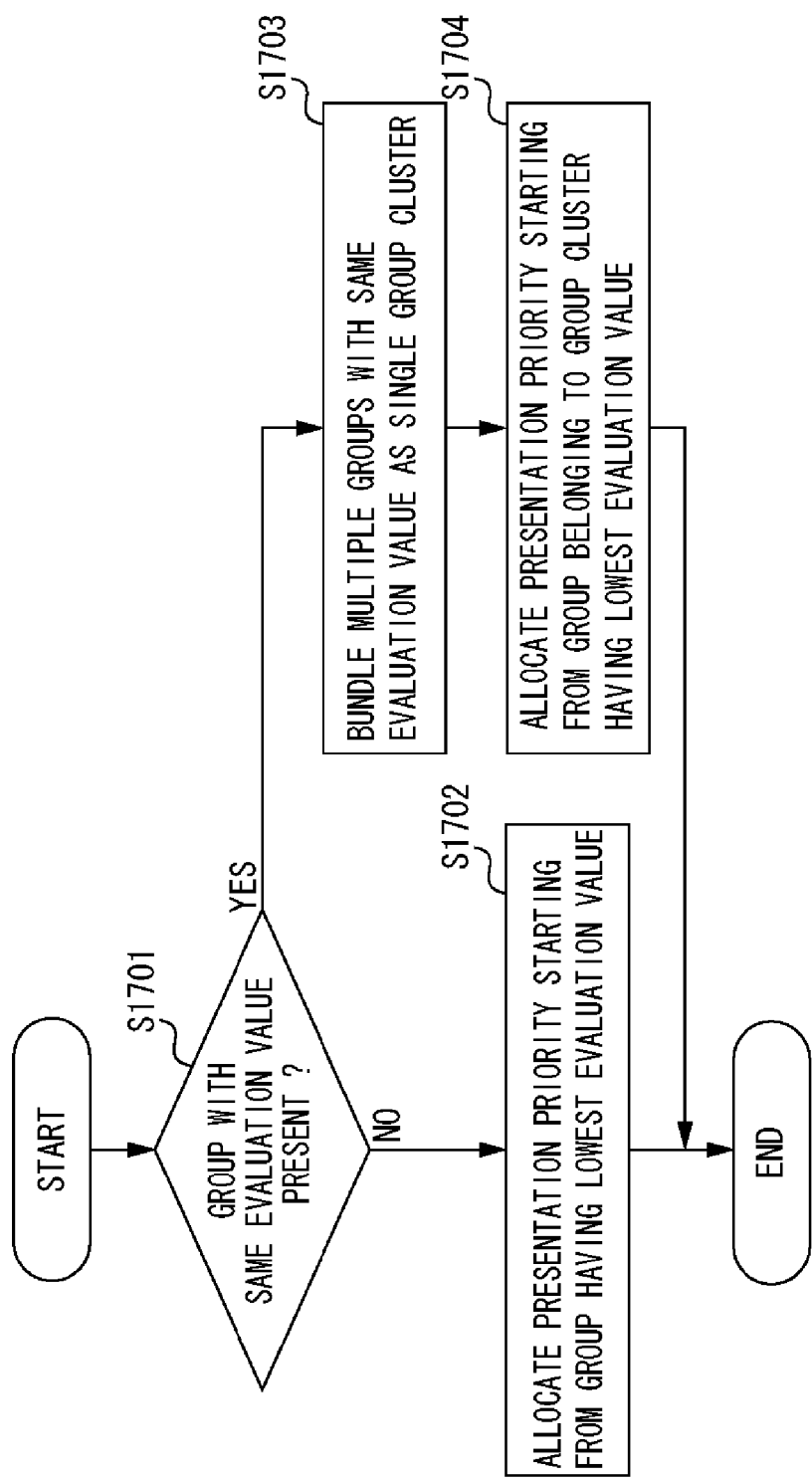
FIG. 18 is a flowchart illustrating presentation priority determination processing according to the fifth exemplary embodiment of the present invention.
Figure 19:
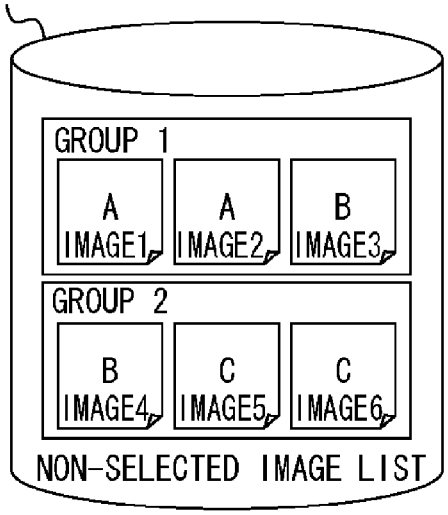
FIG. 19 illustrates a list of various information according to the fifth exemplary embodiment of the present invention.

In the fifth exemplary embodiment too, the basic configuration of the image selection device is the same as the configuration described using FIGS. 1 and 2, and thus a description thereof will be omitted here. FIG. 17 is a flowchart illustrating the overall flow of the processing according to the fifth exemplary embodiment. FIG. 18 is a flowchart illustrating the processing for determining the presentation priority of a group. The flowchart illustrated in FIG. 18 illustrates the details of the presentation priority determination processing of step S1604. In the present exemplary embodiment, the six images, from image 1 to image 6, illustrated in item 1801 of FIG. 19 are used as the input images.

In step S1601, like in step S201 of the first exemplary embodiment, the object information is extracted. In the fifth exemplary embodiment, information specifying the object and information about the group to which the object belongs are used as the object information to be extracted. In step S1602, like in step S202 of the first exemplary embodiment, the initial evaluation value is set. The initial evaluation value is as illustrated in item 1802.

In step S1603, the evaluation value of the group to which the objects belong is calculated based on the evaluation values of each object set in step S1602. The allocation of the evaluation value to the group is performed by adding the evaluation value of each object as an evaluation value of the group to which the objects belong. If an object belongs to two groups, like B, the evaluation value of B is added to both group 1 and group 2. When the evaluation value of each group is the initial value, like in item 1803, the initial evaluation value of the group is also zero.

In step S1604, the presentation priority of the group is determined based on the flowchart of FIG. 18. In step S1701, it is determined whether groups having the same evaluation value are present. If groups having the same evaluation value are present ("YES" in step S1701), the processing proceeds to step S1703. If groups having the same evaluation value are not present ("NO" in step S1701), the processing proceeds to step S1702. In step S1702, the presentation priority is allocated in order from the group having the lowest evaluation value.

In step S1703, groups having the same evaluation value are handled as a group cluster. In step S1704, the presentation priority is allocated starting from the group belonging to the group cluster with the lowest evaluation value. The presentation priority within a group cluster having the same evaluation values is allocated by giving priority to the order used before performing the sorting processing. The presentation priority determined from the evaluation values of item 1803 is illustrated in item 1804.

In step S1605, sorting is performed in group units. At this stage, sorting within the group is not performed. The groups sorted after determining the presentation priority of item 1804 are illustrated in item 1805.

Like in step S205 of the first exemplary embodiment, the processing flow from step S1603 to step S1609 is repeated each time an image is elected until either in step S1606 there are no more selection candidate images, or it is determined to end image selection. When it is determined in step S1606 that image selection is completed ("YES" in step S1606), the processing ends. When it is determined in step S1606 that image selection is not completed ("NO" in step S1606), the processing proceeds to step S1607.

In step S1607, like in step S206 of the first exemplary embodiment, image selection processing suitable for the present exemplary embodiment is performed. In the present exemplary embodiment, as illustrated in item 1901 of FIG. 20, a case is described where image 1 is selected for a one-page album (item 1902).

In step S1608, like in step S207 of the first exemplary embodiment, the object information suitable for the present exemplary embodiment is specified. Therefore, information that object A is contained in image 1 and that object A belongs to group 1 is extracted. In step S1609, like in step S208 of the first exemplary embodiment, an evaluation value is allocated to the object based on the information extracted in step S1608.

Figure 20:
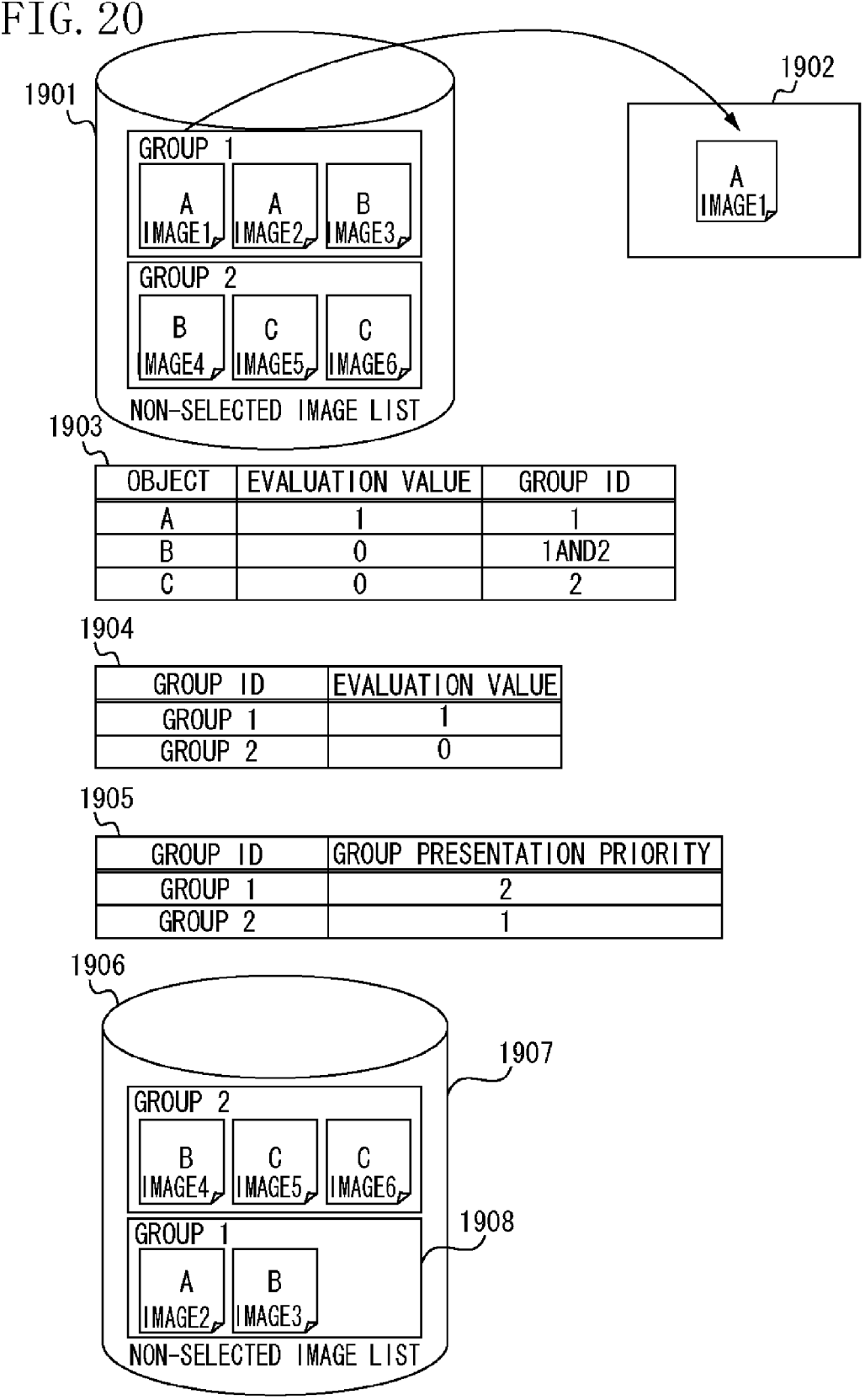
FIG. 20 illustrates the processing which is performed when an image is selected according to the fifth exemplary embodiment of the present invention.

In item 1903 of FIG. 20, the evaluation values after image selection is performed, are illustrated for each object. Since image 1 is selected, "1" is allocated to the object A as the evaluation value. The processing then again returns to step S1603, and the presentation priority of the group is determined based on the object information extracted in step S1601 and the evaluation value set in step S1609. Since group 1 is the only group to which A belongs, 1 is added only to the evaluation value of group 1. The presentation priority of the group determined in step S1604 based on the evaluation values of the groups in item 1904 is illustrated in item 1905. The result of the sorting of each group based on the presentation priority of item 1905 is illustrated in item 1906. As illustrated in items 1907 and 1908, the order of group 1 and group 2 is reversed.

In a sixth exemplary embodiment, a method for updating when displaying the non-selected images will be described. In the first to fifth exemplary embodiments, the sorting processing for all of the images was performed based on the presentation priority. In the present exemplary embodiment, the inconvenience that all of the images that the user can see are sorted, is resolved by sorting only the images which cannot be seen in the image list during image selection. The processing described for exemplary embodiments 1 to 5 until the determination of the presentation priority is applied in the present exemplary embodiment. In the present exemplary embodiment too, the basic configuration of the image selection device is the same as the configuration of the first exemplary embodiment described using FIGS. 1 and 2, and thus a description thereof will be omitted here.

Figure 21:
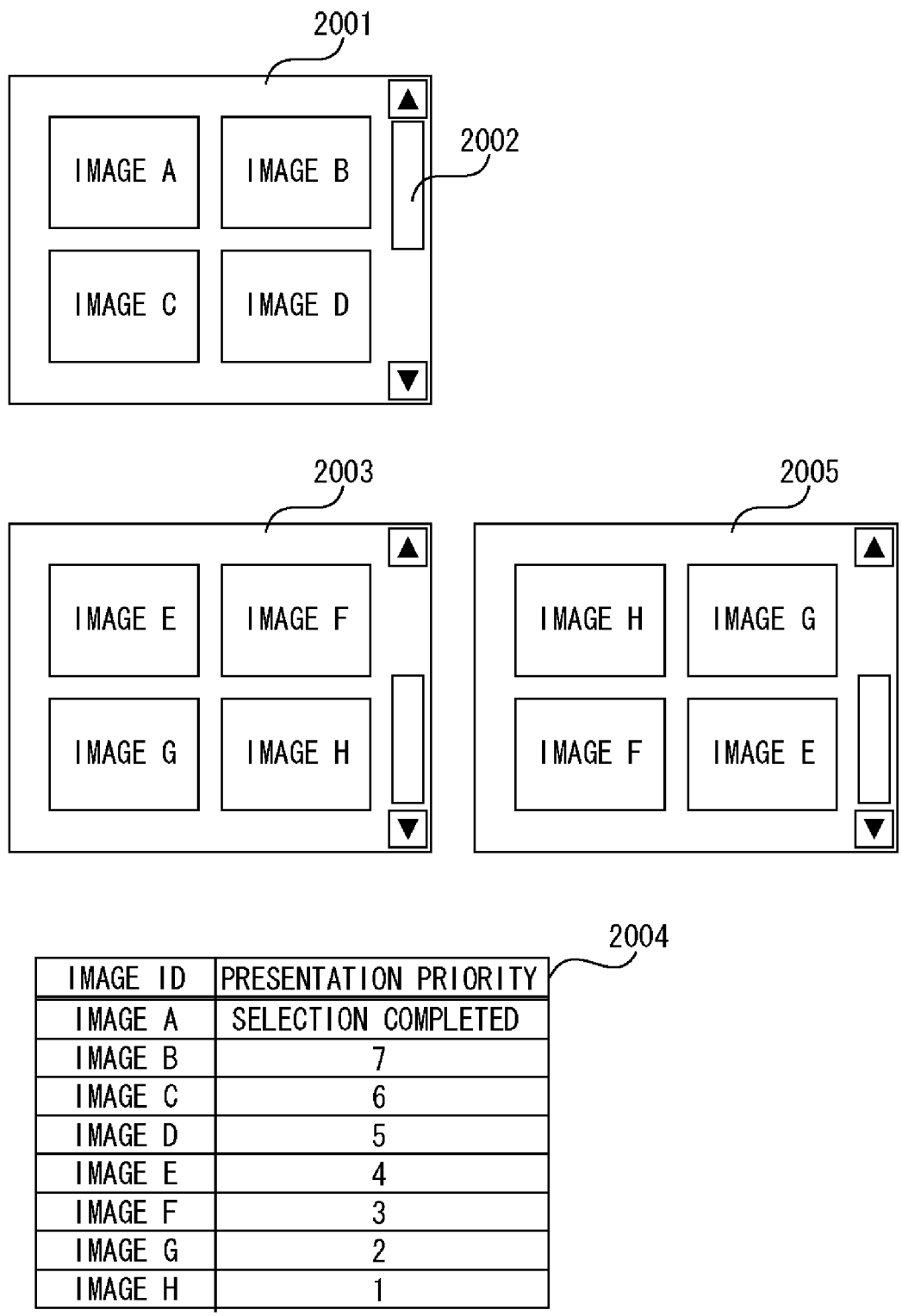
FIG. 21 illustrates a state of a display screen and presentation priority according to a sixth exemplary embodiment of the present invention.

FIG. 21 illustrates the state of a display screen and presentation priority according to the sixth exemplary embodiment. Item 2001 is a non-selected image cluster 1 displayed on the display screen. Item 2002 is a scroll bar. Item 2003 is a non-selected image cluster 2 which is displayed when the scroll bar is scrolled downwards in the state of item 2001. Item 2004 is the presentation priority of a non-selected image determined when image A is selected from item 2001. Item 2005 is the non-selected image cluster 2 after sorting processing.

A case where image A is selected from the non-selected image cluster 1 of item 2001, will now be described. In this case, images A to D illustrated in item 2001 are displayed. Images E to H illustrated in the non-selected image cluster 2 of item 2003 are not displayed. When image A is selected from the non-selected image cluster 1 of item 2001, the presentation priority of the non-selected images is determined as illustrated in item 2004. In the above-described exemplary embodiments, examples were described of sorting all of the images based on this presentation priority. In the present exemplary embodiment, the display state of the non-selected image cluster 1 of item 2001 is maintained and the sorting processing is not performed. Instead, the space where image A was displayed is left blank. Further, one image may be shifted while maintaining the arrangement order so as to fill the space where image A was displayed.

On the other hand, sorting is performed on the non-selected image cluster 2 which is not displayed when selecting image A. The display of the non-selected image cluster 2 after the sorting processing is performed based on the presentation priority illustrated in item 2004, thus as illustrated in item 2005.

Further, while exemplary embodiments were as described above, the present invention can also be embodied as a system, apparatus, method, program, storage medium or the like. Specifically, the present invention may be applied in a system configured from a plurality of devices, or applied in an apparatus configured from a single device.

Further, the present invention also includes cases where the functions of the above-described exemplary embodiments are achieved by supplying a software program to a system or an apparatus either directly or remotely, and reading and executing the supplied program code by a computer of that system or apparatus. In this case, the supplied program is a computer program corresponding to the flowcharts illustrated in the drawings by the exemplary embodiments.

Therefore, to realize the functional processing of the present invention with a computer, the program code itself which is to be installed in the computer also realizes the present invention. Namely, the computer program for realizing the functional processing of the present invention is itself included in the present invention.

In such a case, the program may be object code, a program executed by an interpreter, script data supplied to an operating system (OS) and the like, as long as it has the function of a program.

Examples of the computable-readable storage medium for supplying the computer program include a floppy disk, a hard disk, an optical disk, a MO disk, a CD-ROM, a CD-recordable (CD-R), a CD-rewritable (CD-RW), a magnetic tape, a non-volatile memory card, a ROM, a DVD (DVD-ROM, DVD-R) and the like.

In addition, an example of a method for supplying the program includes using a browser of a client computer to connect to an Internet homepage (web page), and downloading the computer program of the present invention from the homepage onto a recording medium, such as a hard disk. In this case, the downloaded program may be a compressed file containing an auto-install function. Further, the present invention can also be realized by dividing the program code constituting the program of the present invention into a plurality of files, and downloading each of those files from different homepages. Namely, a World Wide Web (WWW) server which allows a plurality of users to download the program files for realizing the functional processing of the present invention by a computer is also included in the present invention.

Further, the program of the present invention may be encrypted, stored on a storage medium such as a CD-ROM, and distributed to a user. In such a case, a user who clears certain conditions is allowed to download key information for unlocking the encryption from a homepage (web page) via the Internet. By using that key information, the encrypted program can be executed. The program may also be installed on a computer.

Further, the functions of the exemplary embodiments can be realized by having a computer execute a read program. In addition, the functions of the exemplary embodiments can be realized in cooperation with an operating system (OS) operating on the computer based on an instruction from the program. In this case, the functions of the exemplary embodiments are realized by causing the OS or the like to perform all or part of the actual processing.

Moreover, all or part of the functions of the exemplary embodiments may be realized by writing a program read from a recording medium into a memory which is provided on a function expansion board inserted into a computer or a function expansion unit connected to the computer. In this case, after the program has been written onto the function expansion board or function expansion unit, based on an instruction from that program, a CPU and the like provided on that function expansion board or function expansion unit performs all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-313398 filed Dec. 9, 2008, which is hereby incorporated by reference herein in its entirety.

What is claimed is:

1. An image selection device for selecting an image from a plurality of non-selected images having attribute information, the image selection device comprising:
   a selection unit configured to select an image from the plurality of non-selected images;
   an evaluation value storage unit configured to store an evaluation value for each value of attribute information of the image selected by the selection unit;
   a determination unit configured to, when the image is selected by the selection means, determine a presentation priority of the non-selected images based on the value of the attribute information of the non-selected images not selected by the selection unit so that the evaluation values are evenly considered; and
   a display unit configured to display the non-selected images on a display screen based on the presentation priority determined by the determination unit,
   wherein when the image is selected by the selection unit, the determination unit determines whether there are a plurality of images from the non-selected images with the same evaluation value, if it is determined that no two images from the non-selected images have the same evaluation value, then the presentation priority is assigned based on the image having a lowest evaluation value, if it is determined that there are at least two images from the non-selected images having the same evaluation value, then the images from the non-selected images are formed into groups corresponding to their evaluation value and presentation priority is assigned based on the group with the lowest evaluation value.

2. The image selection device according to claim 1, wherein the determination unit is configured to determine the presentation priority of the non-selected images each time an image is selected by the selection unit.

3. The image selection device according to claim 1, wherein the determination unit is configured to, when images having the same presentation priority are present, determine the presentation priority using multiple pieces of attribute information.

4. The image selection device according to claim 1, wherein the display unit is configured to, when an image is selected by the selection unit, maintain the display screen before the image is selected by the selection unit, and when a scroll operation is performed, update the screen.

5. The image selection device according to claim 1, further comprising a return unit configured to return the selected image to the non-selected images,
wherein the determination unit is configured to, when the selected image is returned to the non-selected images by the return unit, determine the presentation priority based on the attribute information of the image which was returned by the return unit.

6. The image selection device according to claim 1, further comprising an extraction unit configured to extract the attribute information from the image.

7. The image selection device according to claim 6, wherein the extraction unit is configured to extract the attribute information automatically, manually, or by a combination of automatically and manually.

8. The image selection device according to claim 1, wherein the attribute information is at least one of information specifying an object, a number of objects, an object area, a facial direction of the object, and object expression.

9. A method for controlling an image selection device for selecting an image from a plurality of non-selected images having attribute information, the method comprising:
selecting by a selection unit an image from the plurality of non-selected images;
determining by a determination unit, when the image is selected by the selection unit, a presentation priority of the non-selected images based on the attribute information of the non-selected images which were not selected so that evaluation values stored in an evaluation value storage unit which stores an evaluation value for each value of the attribute information of the image selected by the selection unit, are evenly considered; and
displaying on a display screen by a display unit the non-selected images based on the determined presentation priority,
wherein when the image is selected, it is determined whether there are a plurality of images from the non-selected images with the same evaluation value, if it is determined that no two images from the non-selected images have the same evaluation value, then the presentation priority is assigned based on the image having a lowest evaluation value, if it is determined that there are at least two images from the non-selected images having the same evaluation value, then the images from the non-selected images are formed into groups corresponding to their evaluation value and presentation priority is assigned based on the group with the lowest evaluation value.

10. A non-transitory computer-readable storage medium storing a program for executing on a computer the method for controlling an image selection device according to claim 9.

* * * * *